United States Patent [19]
Jannson et al.

[11] Patent Number: 5,245,404
[45] Date of Patent: Sep. 14, 1993

[54] RAMAN SENSOR

[75] Inventors: Tomasz P. Jannson, Torrance; Kevin W. Shirk, Redondo Beach; Richard C. Kim, Yorba Linda; Behzad M. R. Moslehi, Redondo Beach, all of Calif.

[73] Assignee: Physical Optics Corportion, Torrance, Calif.

[21] Appl. No.: 599,816

[22] Filed: Oct. 18, 1990

[51] Int. Cl.$^5$ .......................... G01J 3/44; G01N 21/65
[52] U.S. Cl. ......................................... 356/301; 385/37
[58] Field of Search .............................. 356/301, 328; 250/227.23; 385/37

[56] References Cited

U.S. PATENT DOCUMENTS

| | | | |
|---|---|---|---|
| 4,640,574 | 2/1987 | Unger | 385/37 |
| 4,760,569 | 7/1988 | Mohlein | 385/37 |
| 5,026,131 | 6/1991 | Jannson et al. | 385/37 |

Primary Examiner—F. L. Evans
Attorney, Agent, or Firm—Nilles & Nilles

[57] ABSTRACT

A multiwavelength sensor for sensing light scattered from a scattering medium includes a light source, a uniform broadband reflection grating at the Littrow position, a fiber, and a detector. Light from the source is incident on the grating, which diffracts the light. The fiber has a first end into which the light diffracted from the grating is received and has a second end from which the light exits, the fiber being positioned so that the light is incident upon and scattered from the scattering medium. At least some of the light scattered from the medium is scattered back into the second end and out of the first end and incident upon the diffraction grating. Light out of the first end and diffracted from the grating is incident on the detector. The system is fully transparent so that light traveling toward the second end and light traveling back toward the first end are optically isolated and cross-talk is substantially nonexistent.

5 Claims, 14 Drawing Sheets

RAMAN SENSOR

BACKGROUND OF THE INVENTION

1. Field of the Invention

The present invention pertains to the transfer of data signals point to point. More particularly, the invention relates to transfer of data between source and receiver wherein the data in the form of an electrical signal is converted into light waves, transferred via a fiber optic cable to a receiver and then converted back into an electrical signal.

2. Description of the Prior Art

Transmission of multiple data signals from one point to another can be accomplished in a virtually unlimited number of ways. Transfer of information can occur over different frequencies (optical, microwave, & radio) and media including air, twisted wire, coax and more recently, fiber optic cables. Examples of data transmission in air include television and radio. Transfer of information by wire could include, for example, macroscopic structures such as coax or twinax cable for carrying a television signal from a receiving antenna to a television set or a cable connecting a peripheral unit such as a printer to a personal computer, to microscopic structures such as the minute electrical paths that guide electrons in an integrated circuit. Examples of transmission of data using fiber optic cables include fiber optic telephone cables. In each of these types of systems it is typically desirable that data should be transferred between source and receiver as quickly as possible and with utmost accuracy and maintenance of desired signal characteristics.

Two broad categories of transmission of data would include transmission by analog and digital means. Within each of these types of transmission, numerous modulation techniques of data have been used including FM, AM, and pulse modulation (PM). Techniques providing means for not only modulating a carrier with information from one signal but for multiplexing numerous signals for transmission together include time division multiplexing (TDM), and frequency division multiplexing (FDM). FDM in essence involves stacking a number of data channels side by side in the frequency domain to form a composite signal. The composite frequency multiplexed signal is used to modulate a carrier in a conventional manner. TDM is a derivative of pulse modulation and involves interleaving in time the narrow pulses of several pulse modulated signals to form one composite signal. Separation of the TDM pulses at the receiver is accomplished by directing the pulses into individual channel filters.

In recent years, as a result of the maturation of fiber optic technology in transmission systems, advances have been made in a multiple carrier technique referred to as wavelength division multiplexing (WDM). This technique is the optical equivalent of frequency division multiplexing used in RF coaxial transmission. In WDM, each discrete data channel is modulated onto an optical carrier of a fixed wavelength and each of the carriers are then fed into the optical transmission medium. The individual carriers are recovered at the receiver by separating the carrier into its individual wavelength components. One such example of a WDM is disclosed in U.S. Pat. No. 4,926,412, the essentials of which are incorporated by reference herein. There, a WDM is disclosed having paraxial transmission optics.

A transmission optics WDM differs from a reflection optics system in that in the former, the light beam changes direction only once in the system; it is first collimated by a lens, diffracted by a grating, and then focused by the lens into the fibers. In paraxial optics, the input and output optical fibers are maintained close to the optical axis to limit losses in the system due to dispersion broadening, and image aberrations.

In a reflection optics WDM, the beam changes direction three times; the beam is first collimated by a mirror, diffracted by a grating located in roughly the same plane as the fiber ends, and focused by the first mirror into the fibers. References relating generally to optical fibers and fiber communications are plentiful and include for example: S. Miller and I. Kaminow, Optical Fiber Telecommunications (Academic Press, 1988); and D. Baker, Fiber Optic Design and Applications (Reston, 1985) incorporated by reference herein.

Without question, transmission of data optically versus by wire means is becoming more and more prevalent. Numerous reasons exist for using optical transmission of data, as opposed to electrical transmission including bandwidth limitations, electromagnetic interference, weight and bulk. In order to achieve high bandwidth in an electrical data transmission system, the wires must have large diameters for shielding from EMI and consequently are bulky and heavy. Furthermore, power losses associated with data transmission over electrical wires are very large, and signal repeaters must be placed at relatively small intervals (500 m) even for low frequencies (<10 MHz).

Transmission of data optically, on the other hand, can provide huge bandwidth characteristics, extremely low loss even over long distances and immunity to electromagnetic radiation even in environments saturated with electronics such as aircraft. Furthermore, because the bandwidth of an optical fiber actually increases with a decrease in the diameter of the fiber optic cable, huge bandwidths (>300 MHz for 1 km length of multimode fiber) are obtainable with extremely light and nonbulky transmission lines.

Although the majority of LANs are still coax-based or "twisted pair", video transmission systems, which are more demanding than LANs because of higher bandwidth requirements and remote location desirability are better suited to fiber optics. Typical high speed fiber optics systems are RGB, closed circuit television (CCTV), and computer aided design (CAD). RGB and CCTV are typically analog with a 10-50 MHz throughput while CAD is digital or analog with 120-300 MHz throughput. Typical multi-mode fibers used for data transmission have 50/125 $\mu$, 62.5/125 $\mu$, 100/140 $\mu$, and 200/380 $\mu$ core diameters. Fibers having these four core/cladding diameters are standard in most fiber optic applications and their cost of manufacture continues to decrease. Note that in a state of the art single-wavelength design only the core diameter is important because the core contains the traveling beam to the exclusion of the other portions of the fiber such as the cladding.

The advantages of optical transmission of data have not escaped industries where transfer of data is critical to transaction of daily business. Video local area networks (LANs), security systems, and the securities brokerage industry are three examples where transfer of information by fiber optic cable has been in place for sometime. Fiber optic cables have been used to transfer data between a video camera and a security alarm processor in high end security systems. In another application, information is transferred between a main computer that keeps track of market conditions and the tens of screens in a securities trading room.

In the future, Integrated Services Digital Networks (ISDN) which may provide 3-channel information for homes and businesses (telephone, video and data) will require high quality transmission. These systems, and Broadband Integrated Services Digital Networks (BISDN) will become commonplace.

In securities trading applications, typically called data feed terminal systems, the three video components (red, green, and blue), are continuously fed to trading room video screens in basically two ways. One means of transfer currently in use is inputting each of the three components of the video signal from the source computer into a light emitting diode (LED), or laser diode (LD) which converts each of the electrical signals to a light signal which is then fed, via a dedicated, separate optical path, to the trading screen. Another slightly newer and less common approach is to first multiplex (using TDM) the three electrical components of the video signal and then feed the multiplexed electrical signal to a LED, or LD for conversion to a multiplexed light wave which is then fed to the trading room video screen and reconverted to three electrical signals. Most such systems in use today are standardized around the RS 170 standard for computer generated video signals.

The major drawback of the first system is that it requires the use of three separate modules in the electronics rack and, most importantly, requires three lengths of fiber optic cable to be run from the central computer to the trading room screens potentially many floors below. This obviously creates size and cost constraints. The major drawback of the slightly newer implementation of data transfer (TDM) is that the signals must be electronically multiplexed and then fed to a laser which must convert the multiplexed electrical signal accurately into a multiplexed light wave and transmit it to the video screen. Committing one light source to the task of converting a multiplexed electrical signal into a multiplexed light signal is less than desirable because it is typically a low efficiency conversion. The bandwidth of the fiber also becomes an issue in this format because 200 $\mu$ core fiber cannot effectively transmit the bandwidth of an RGB signal on a single wavelength due to modal dispersion. Length is an issue as well; the signal can be broadcast but only over very short distances.

Still another disadvantage of TDM technique is that the multiplexed signals must be of the same modulation format, usually digital. To the contrary, WDM fiber-optic systems can multiplex, through various wavelength carriers, not only different format signals such as digital and analog, but also various types of information related to different wavelengths, specific to a particular sensing medium such as in Raman spectroscopy, for example.

There are two basic types of light sources used in optical fiber data transmission, light emitting diodes (LEDs) and edge limiting LEDs (ELEDs), and laser diodes (LDs). Surface emitting LEDs have been in use for many years in many different applications. They are extremely reliable and relatively inexpensive. Laser diodes, on the other hand, are a much more recent technology, are slightly less reliable than LEDs, and are usually more expensive. LDs, however, as well as ELEDs have certain advantages over LEDs, that are becoming consistently achievable as LD technology matures in the compact disk (CD) industry. LDs are well known in use as the light source for reading CDs in now quite common CD players. The market for LDs created by the CD industry is large and has caused the development of standard LD wavelengths located in the 1st transmission spectral window: 750-850 nm. Within this range, Sharp has developed standard LD WDM wavelengths 750, 780, 810, 840, all in the vicinity of the CD wavelength 780 nm. Siemens, Hitachi and Ortel also make LDs. Because of the huge production of LDs in these standard wavelengths, LDs have become extremely low cost ($10-$30) and price competitive with LEDs. Recently, ELED technology has achieved maturity, with a typical unit price of around $100. ELEDs' wavelengths, on the other hand, are located in the 2nd transmission window, around 1300 nm.

The primary advantage of LDs over LEDs is that LDs have much narrower spectral characteristics. Furthermore, LDs are much faster than LEDs. It is difficult to achieve 200 MHz with LEDs, while LDs can obtain 1GHz bandwidths. Additionally, the life of a typical laser diode is 250,000 hours or 120 years assuming it is not abused with high current or physically damaged. Also ELEDs have significantly narrower linewidths than surface-emitting LEDs, typically 50-100 nm versus 100-200 nm.

Unfortunately, with respect to transmission of multiple channels from source to receiver, TDMs and FDMs require very troublesome and sophisticated electronics while multifiber solutions are expensive and difficult to implement in space tight applications. Therefore, a data transmitting system that does not require the use of TDM or FDM multiplexing nor multiple fibers would be of great benefit and cost saving for all data transmission applications.

SUMMARY OF THE INVENTION

A multiwavelength data communication link employing low cost LDs and/or ELEDs, holographic wavelength dependent dispersive grating elements, multimode optical fibers and associated electronics is presented. Specifically, low cost LDs within the single transmission window 750 nm-850 nm, as well as around 1300 nm, are modulated with the data to be transferred. A paraxial grating WDM, resistant to adverse effects from even substantial wavelength shift, may multiplex the separate modulated laser diode light beams for transmission on a single fiber optic cable to a receiver comprising a similar WDM (also called WDDM) which demultiplexes the multiplexed data into the original data channels. Electronic circuitry converts the individually modulated light waves into their electrical counterparts and then feeds the channels to the receiver. In another embodiment, the optical signal is modulated by a sensing medium, before it is transformed in to an electrical signal.

Low cost GaAs LDs manufactured in the most common wavelength ranges and particularly 780 nm standard in the CD industry may be used as sources. GaAs LDs in the 750-850 nm window are particularly low cost and may act as the carrier for a separate channel of information (or more than one channel if TDM or FDM is employed) to be transferred independently and with extremely low cross-talk (or optical isolation), and nearly full transparency. The LDs receive their respective data channel information from electronics which adapt the channel in electronic form to the LD for conversion to a light wave modulated with the information. Each of the modulated light waves is then space-multiplexed in a fiber cable using wavelength division multiplexing techniques.

A preferred WDM comprises paraxial optics and a holographic dispersive element, preferably a broadband reflection quasi-Littrow grating, which assures extremely high multiplexing efficiency. The fiber optic cable on which the information is sent is a multi-mode fiber capable of handling the number of multiwavelength channels. The fiber optic cable therefore has extremely high total bandwidth, multiplying the bandwidth capacity by the number of wavelengths multiplexed. Fiber optic cable diameters standard in the industry may be used further lowering cost. The multiplexed signal in the fiber optic cable is received by another similar WDM (WDDM) which demultiplexes the signal into discrete signals corresponding to the original data channels. Again, the low loss and cross-talk of the WDM having paraxial optics and a holographic dispersive element makes the demultiplexing operation highly efficient. The demultiplexed modulated light waves may then be fed to three or more photo detectors which convert the light waves back into electrical signals. The converted electrical signals are then fed to a receiver such as a data feed terminal or video monitor. It should be emphasized that demultiplexing (WDDM) is more critical than multiplexing (WDM) because WDM can be accomplished in a number of alternative ways with good power budget, while only paraxial WDDM can separate wavelengths with high efficiency and low cross talk.

The above combination provides the ability to transmit a number of independent (multiwavelength) channels (analog & digital) within a single transparent window less than 200 nm wide with nearly full transparency and extremely low cross talk. The present invention enables voice, video, analog, or digital signals to be transferred point to point inexpensively and with a minimum of fiber length, equipment, and bulk. Importantly, the present invention therefore has a variety of applications, is low in cost, especially due to the ability to use current CD LD technology and low cost electronics, a variety of standard fiber types and lengths including lengths greater than 1 km with excellent power budget, high tolerance to wavelength shift, low cross talk, and full transparency. These highly optimal results, heretofore unobtainable, are achievable due to a combination of paraxial transmission optics, optimized WDM design, high quality highly uniform and broadband wavelength reflection holographic gratings and either multiwavelength low cost single window operation CD LDs, or rapidly maturing ELEDs.

DESCRIPTIONS OF THE DRAWINGS

Figure 16A:
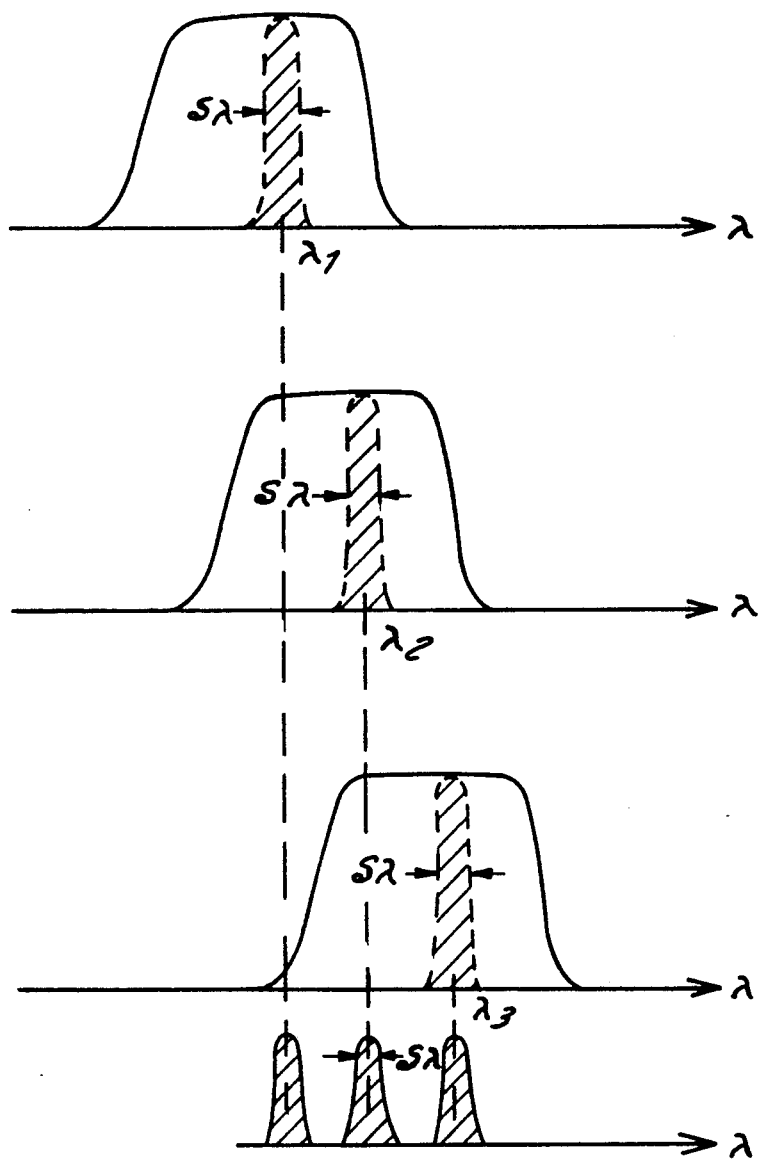
Figure 17:
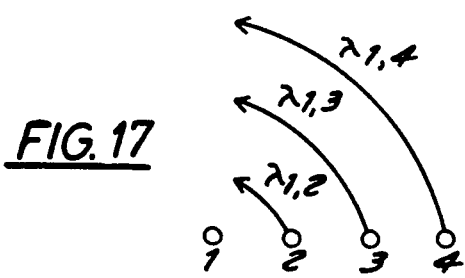
Figure 19:
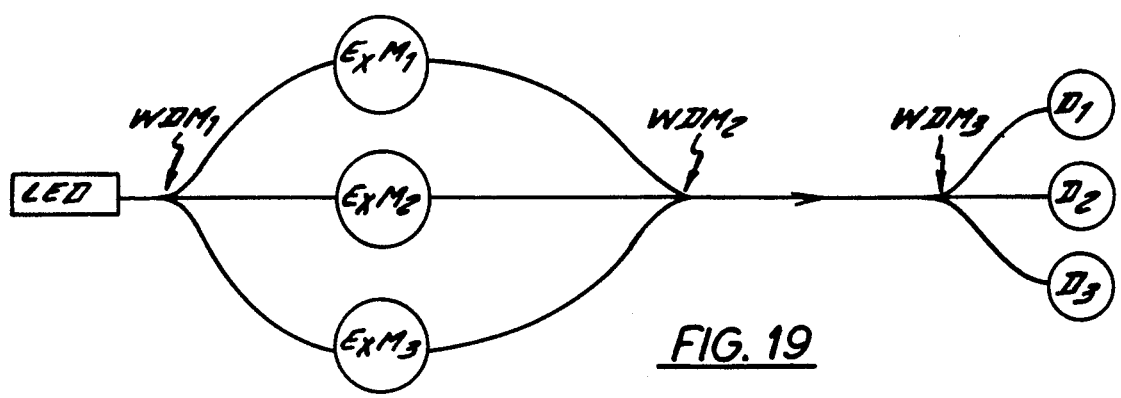
Figure 20:
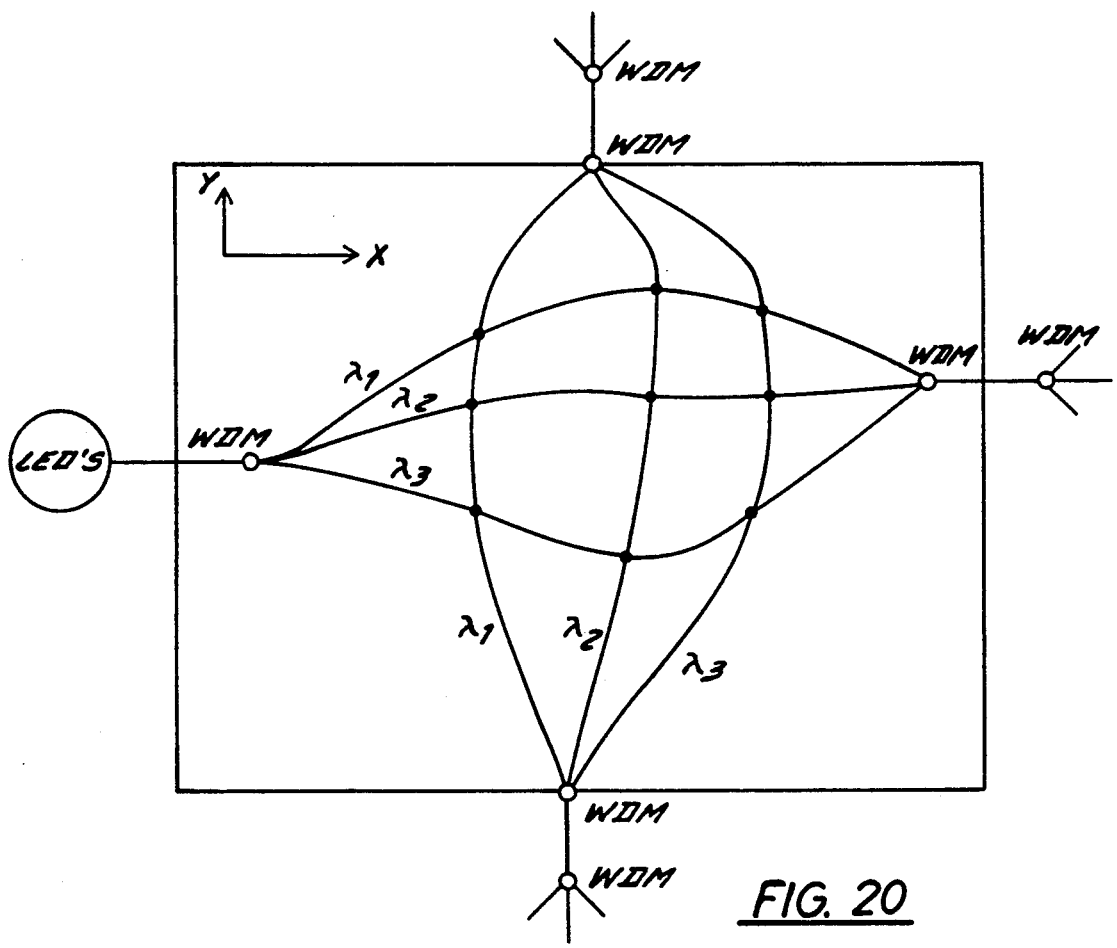
Figure 21A:
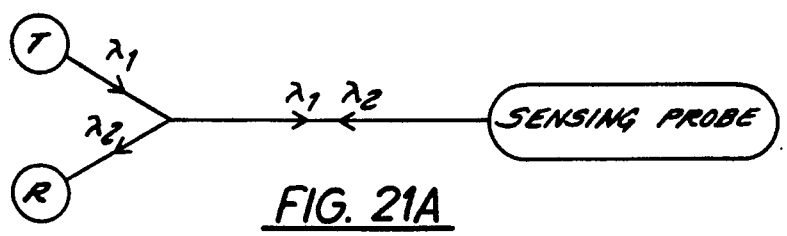
Figure 21B:
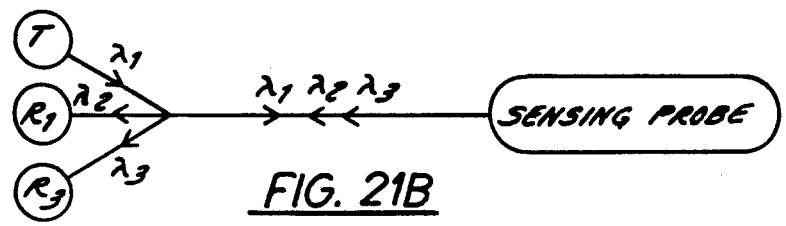
Figure 22:
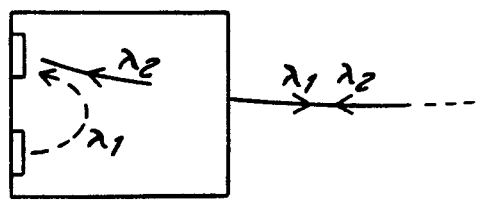
Figure 24:
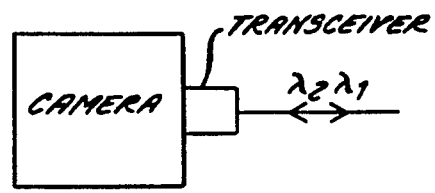
Figure 23:
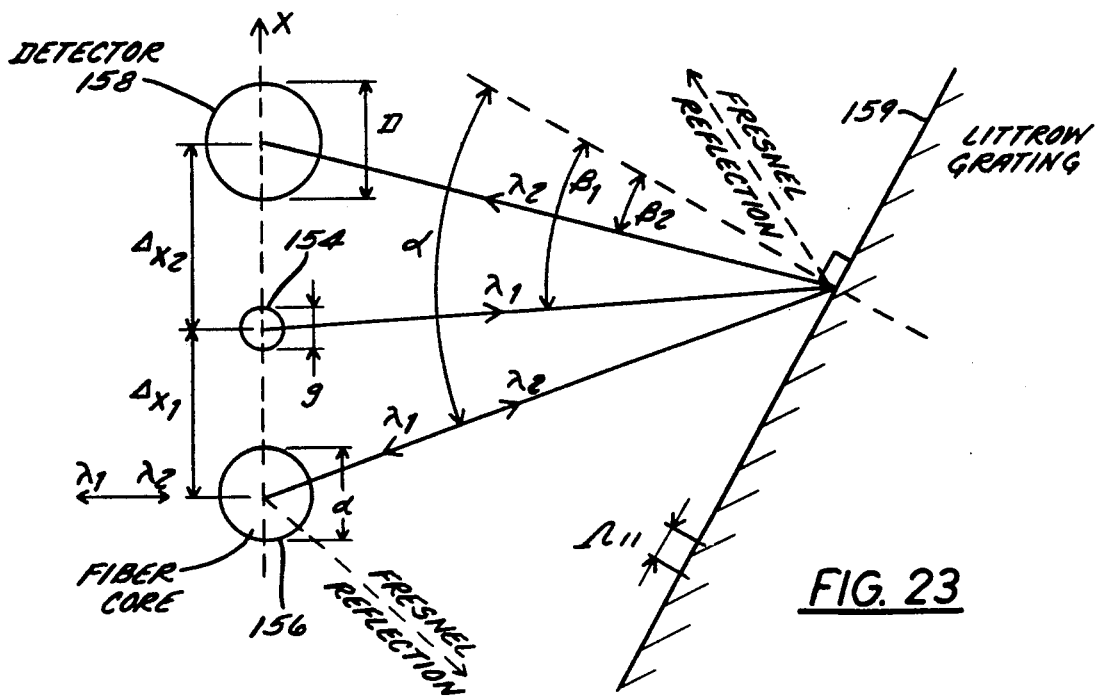
Figure 25:
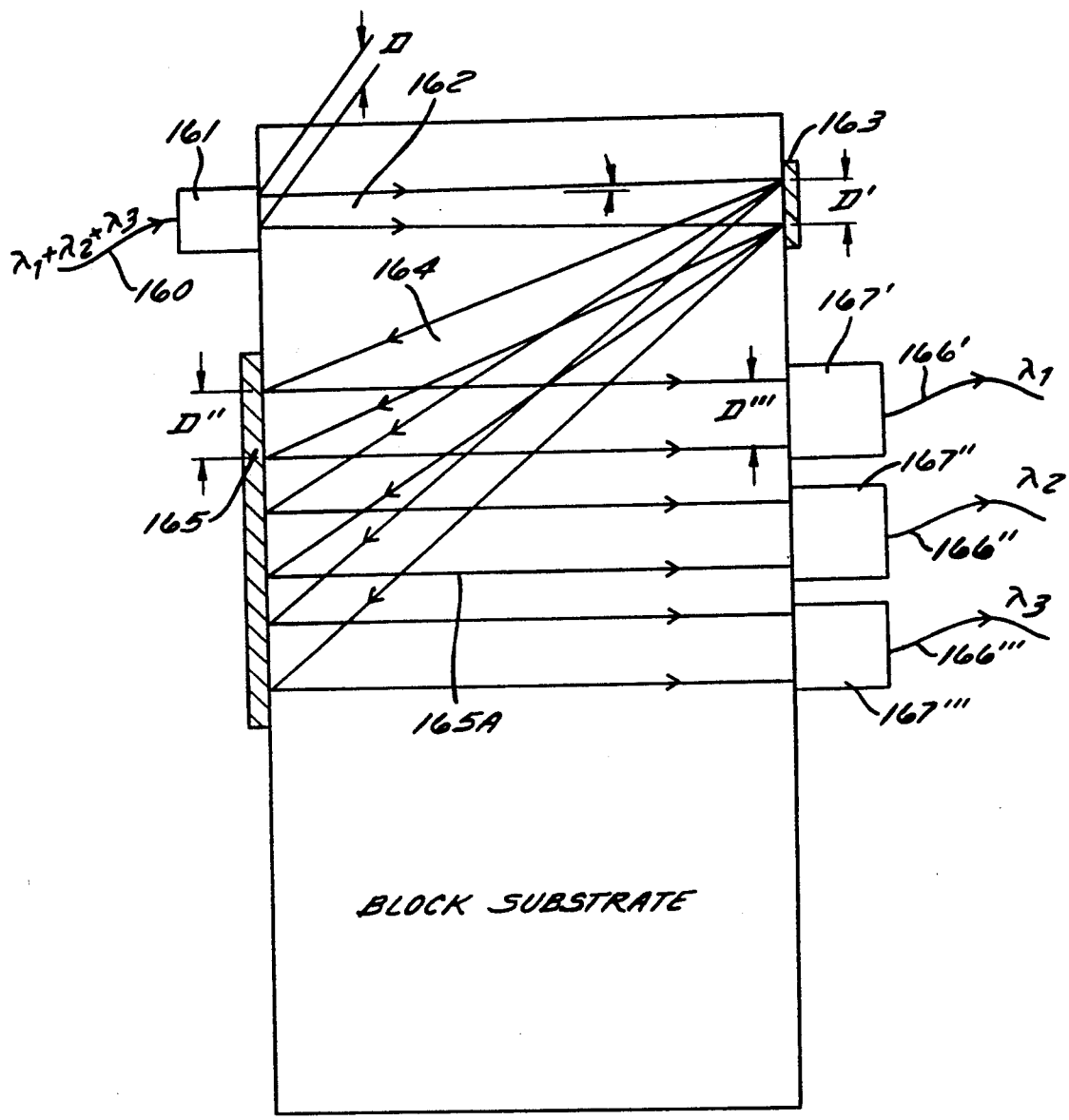

FIGS. 16A and B show the filtering effect of the present invention;

FIG. 17 shows the relationship between fibers and their wavelengths in of the present invention;

FIGS. 18A–D show the filtering effect of the present invention using only one light source;

FIG. 19 is a schematic of a multiple external modulator system of the present invention;

FIG. 20 is a schematic of a "smart skin" sensor system of the present invention;

FIGS. 21A–B are schematics of Raman sensors of the present invention;

FIG. 22 is a schematic of cross-talk isolation structure of the present invention;

FIG. 23 is a schematic of a bidirectional WDM grating splitter of the present invention;

FIG. 24 is a schematic of a security camera system in accordance with the present invention;

FIG. 25 is a schematic of a dispersion-compensation WDM system of the present invention.

DESCRIPTION OF THE PREFERRED EMBODIMENTS

Figure 1:
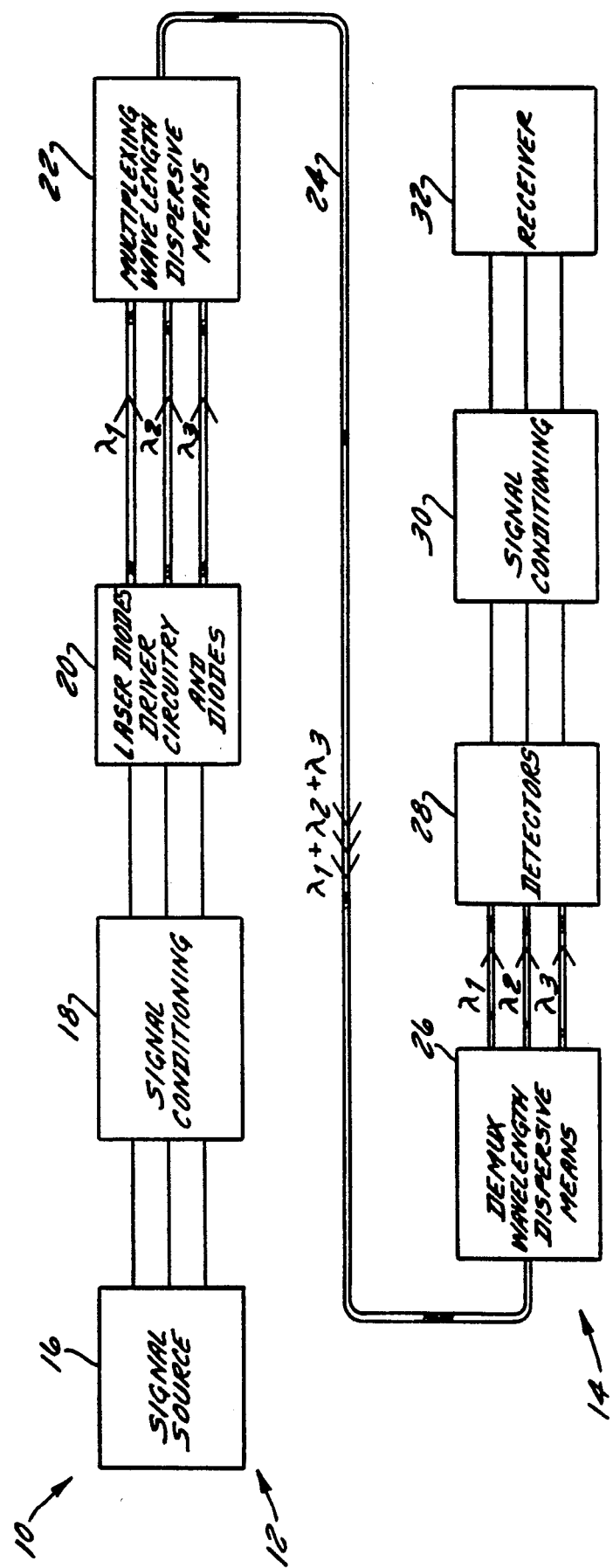
FIG. 1 is a block diagram of a video system in accordance with the present invention.

Referring now to FIG. 1, a multiwavelength data communication link 10 comprising transmitter 12 and receiver 14 is depicted. Transmitter 12 may comprise signal source 16, signal conditioning circuitry 18, laser diode driver circuitry and diodes 20 (which may alternatively be ELEDs), and multiplexing wavelength dispersive means 22. Signal source 16 may comprise any multichannel signal such as video, computer, telephone or other data channels, or multi-color RGB signal. Signal conditioning circuitry 18 conditions and adapts the signal for input into the laser diode driver circuitry and laser diodes 20. Laser diode driver circuitry and diodes 20 receive the conditioned signal and output that signal in light wave form to multiplexing wavelength dispersive means 22, for exemplary wavelengths $\lambda_1$, $\lambda_2$, $\lambda_3$ as shown in FIG. 1.

Each channel is provided a dedicated line for transfer between signal source 16, signal conditioning circuitry 18, and laser diode driver circuitry and laser diodes 20, and the multiplexing wavelength dispersive means 22. The laser diode driver circuitry may comprise standard circuitry that provides the proper voltages for operation of the laser diodes Such circuitry may comprise for instance a standard biasing circuit to bias the LD above threshold and below kinks in the current vs output curve, and a standard op-amp circuit for adjustable scan of the input. The laser diodes in block 20 may preferably comprise standard laser diodes used in the CD industry having standard operating wavelengths of 750, 780, 810, and 840 nm. Sharp laser diodes may preferably be used, but for higher speed links (>20 MHz per wavelength), other LDs or ELEDs may be more convenient. These LDs are low cost because the thickness of the aluminum needed to be doped into the LD for this wavelength range (particularly 780 and 810 nm) to achieve proper band gap energy and wavelength can be accomplished without unduly stressing the GaAs layers which bound the aluminum doped layers in the liquid phase epitaxial growth (LPE) process.

Multiplexing wavelength dispersive means 22 may comprise any device which multiplexes light signals according to wavelength. In the preferred embodiment, the multiplexing wavelength dispersive means may comprise a highly paraxial WDM having a highly uniform and broadband reflection grating with high diffraction efficiency wavelength characteristics. Less desirable but operable gratings include transmission gratings and mirror based reflection gratings. Preferred high diffraction efficiency gratings may include DCG volume holographic gratings and photopolymer volume holographic gratings, if the photopolymer has sufficiently broadband uniform wavelength characteristics. Some types of photoresist gratings having above average diffraction efficiency and broadband width uniform characteristics may be used as well. Particularly advantageous gratings would include highly nonuniform volume holographic DCG gratings wherein nonuniform alcohol-water processing techniques are used to create a grating having an extremely flat efficiency curve over the wavelength range of interest. Such a highly nonuniform volume holographic grating is fully described in U.S. application Ser. No. 435,608, the essentials of which are incorporated by reference herein.

The transmitter 12 is connected to the receiver 14 via multimode fiber 24 which may comprise any of the standard multimode fibers presently manufactured. The relative core to cladding diameter ranges for these standard fiber sizes are: 50/125, 62.5/125, 100/140, and 200/380. The cost of multimode fibers in these standard size ranges continues to decrease thereby making their use in the present invention advantageous. A 1 km length of these fibers, a length which may be necessary in large installations, would present only a 4-6 dB loss.

The receiver 14 in FIG. 1 comprises demultiplexing wavelength dispersive means 26, detectors 28, signal conditioning circuitry 30, and receiving unit 32. The demultiplexing wavelength dispersive means 26 may comprise the same type of wavelength dispersive means used for the multiplexing wavelength dispersive means 22 in the transmitter 12. Demultiplexing wavelength dispersive means 26, however, obviously has one multimode fiber as its input and three multimode fibers at its output (or a number of output multimode fibers corresponding to the number of channels in the system).

The output of the demultiplexing wavelength dispersive means 26 is connected to detectors 28 which detect the various wavelength light signal channels and convert them to electrical impulses corresponding to standard logic levels at the transmitter 12. Standard photodetectors may be used for this purpose, and advantageously, these photo detectors may be low speed detectors which further reduce the cost of implementing the present invention. This is in contradistinction to the high speed photo detectors needed in a TDM system as discussed above. For example, in order to transmit 100 MHz aggregate bandwidth, the TDM case requires high speed detectors with 100 MHz bandwidths, while in the 5-wavelength WDM case, 20 MHz lower speed detectors are sufficient. Inexpensive silicon can be used for the 800 nm window. This points up the unexpected advantages of the present combination wherein the components may be standard low cost components, which when combined nonetheless yield very high efficiency and low loss and excellent power budget (approximately 20 dB power margin), high tolerance to wavelength shift (approximately 10 nm), low cross-talk (less than −20 dB optical or equivalently −40 dB electrical), and full transparency (i.e., each wavelength carrier is transmitted completely independently of other wavelength carriers).

The output of the photo detectors 28 is input to the signal conditioning circuitry 30 which prepares the signal (at the same logic levels 0–5 V digital or IV p-p analog as at the transmitter) for input to the receiver 32 which may comprise any number of receiving units such as standard data feed terminals.

Figure 2:
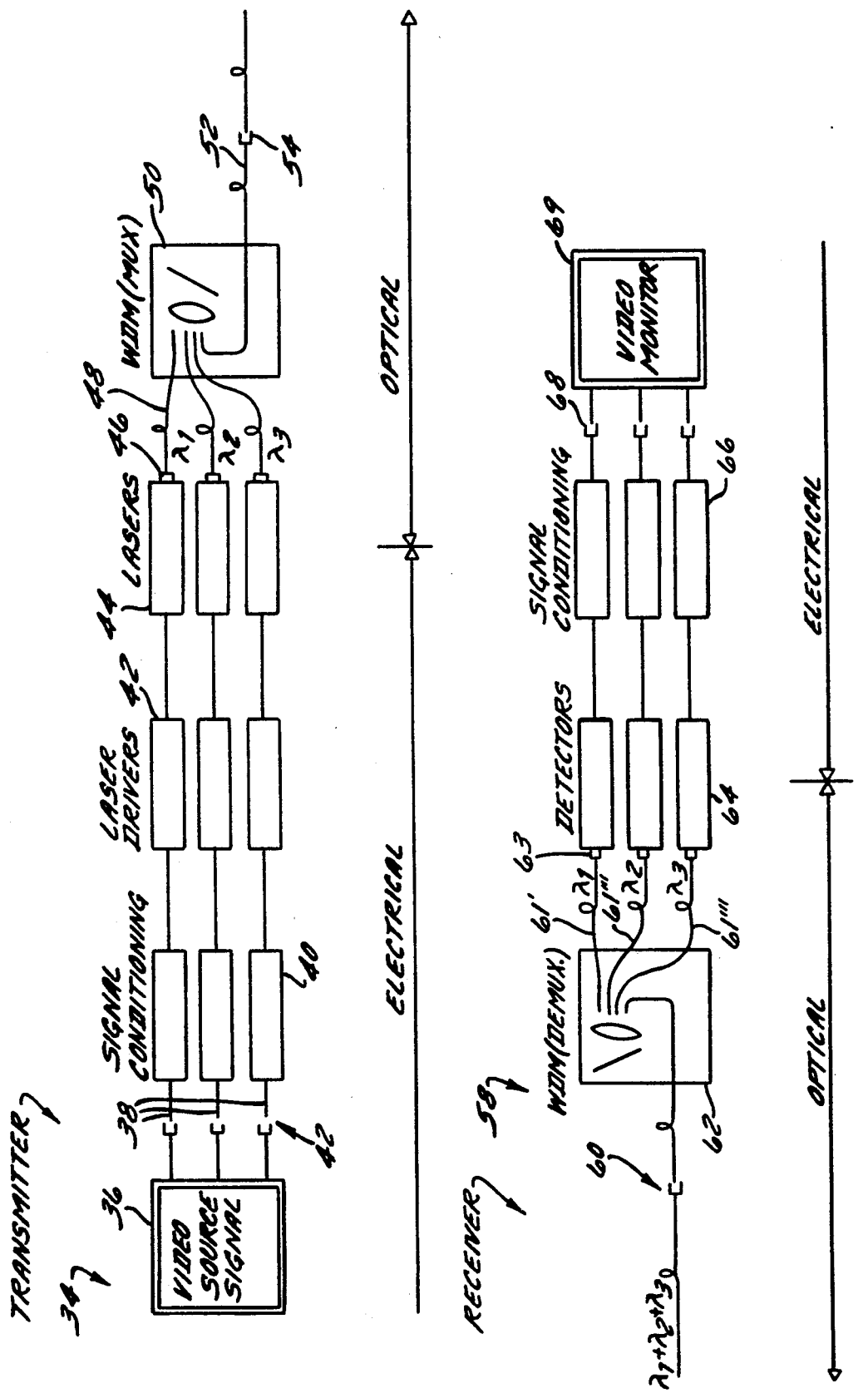
FIG. 2 is a schematic of the electro/optic circuit modules shown in FIG. 1 in accordance with the present invention.

Referring now to FIG. 2 a more detailed schematic of the exemplary multiwavelength data communication link 10 in accordance with the present invention with respect particularly to video signals is depicted. A preferred transmitter 34 comprises multichannel video source signal 36 having one output line 38 for each channel which inputs the signal to the signal conditioning circuitry 40 through 75-ohm BNC connectors 42. Signal conditioning circuitry 40 may comprise individual signal conditioning circuitry for each channel. Signal conditioning circuitry 40 outputs the respective channels electrically to standard laser drivers 42. Laser drivers 42 output their electrical signal to lasers 44, there being one laser per channel. The 3 mW lasers 44 output their laser light waves onto fibers 48 through laser pigtails 46. Alternatively, 1 mw ELEDS may be used. Fiber optic cables 48, which may at this point comprise single mode fiber optics fiber lengths due to the need to transmit only one wavelength per cable, are input to multiplexing WDM 50. Pigtails 46 are essential to minimizing the effects of feedback which include mode hopping between the lasers' longitudinal modes, bias point shift, and wavelength shift due to a secondary resonator structure in the fiber. Without control of feedback, bias point optimization at set-up will likely be lost.

Figure 3:
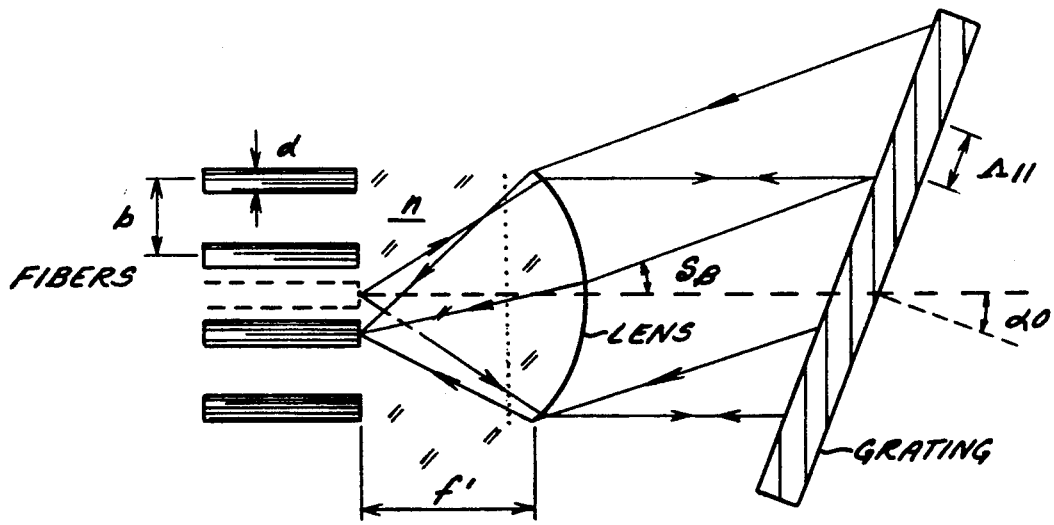
FIG. 3 is a schematic of a grating configuration of a link in accordance with the present invention.

WDM 50 in a preferred embodiment may comprise the WDM disclosed in U.S. Pat. No. 4,926,412. Briefly, the comprises a housing, a Fourier transform lens and a holographic dispersion grating as shown in that patent. The WDM has close orientation of the fibers about its optical axis and a holographic dispersion grating which reduces losses in the system, the essentials of which are incorporated herein as shown in FIG. 3 where d is the fiber core diameter, b is the core-core distance, $\alpha_0$ is the Littrow angle, $\Lambda_{11}$ is the grating period and f' is the focal length in medium n. (Alternatively, the medium with refractive index $\bar{n}$ can be replaced by free space. Then, only the lens remains with refractive index n, and f' = f). Unlike state of the art systems in which only core diameter is critical, cladding diameter as well as core diameter is important in the present invention because cladding diameter determines the spacing of the fibers. The use of highly-efficient holographic dispersion gratings enables the multiplexing WDM to highly efficiently multiplex the four or more channels simultaneously.

The output of the WDM 50 in FIG. 2 is preferably placed on a multimode fiber having a core to cladding diameter ratio of 62.5/125, 100/140 or 200/380 standard in the industry. Each of the signals in the multimode fiber 52 comprises a separate wavelength in the fiber 52 ($\lambda_1 + \lambda_2 + \lambda_3$) so that the signals are multiplexed without interference, i.e., low cross talk, and full transparency. Completely different signals can be transmitted bidirectionally over the same multi-mode fiber. For instance, analog video, and digital Ethernet signals can be simultaneously transmitted on a single fiber unlike TDM systems. In other words, due to full transparency, the multimode fiber 52 allows the multiple channels space multiplexed therein to travel in the fiber and behave as if the other channels traveling in the fiber did not exist. Of course, each wavelength can, in addition, combine a number of TDM channels. Coupler 54 couples the 100/140 cable and the 200/380 cable. The coupler 60 couples the 200/380 fiber to a 100/140 fiber which is then input to a demultiplexing WDDM 62 which may preferably comprise the same components as the multiplexing WDM 50 in transmitter 34.

A preferred arrangement is the use of one size fibers to keep the numerical apertures of the two fibers the same. Generally mixing fiber sizes is undesirable because it increases power budget (decreases power margin) and causes signal disturbance. These effects are due to incompatible numerical apertures (NA) (which defines the total internal reflection (TIR) angle of the fiber) which causes the non-filling of all possible TIR angles within one or both of the fibers. When a fiber whose full complement of TIR angles is not filled is bent, the signal within the fiber is disturbed. Modual Partition noise due to differential attenuation of optical paths taken in the multi-mode fiber can limit the "noise" floor of the system when a coherent source such as an LD is used. Thus, it is preferred to use fibers of equal diameter, especially for analog systems.

On the other hand, in the unidirectional case, different sizes of internal WDM fibers can be used. For example, in FIG. 2, where the beam is transmitted only from the left to the right, fibers 48 can have smaller cores than simple WDM fiber 52, even if the connector 54 is not used, and fibers 52 and 50 are identical. Analogously, identical fibers 61', 61'', 61''', can have larger sizes than external WDM fiber 52. In such a case, power subject and cross-talk can be improved, but the system can be only unidirectional. In order to preserve bidirectionality, however, all fibers may preferably be identical.

Retrofit of existing systems frequently requires matching different diameter fibers, however, therefore the arrangement in FIG. 2 is apt. The WDM 62, however, instead of having three input fibers and one multiplexed output fiber instead has one multiplexed input fiber and three demultiplexed output fibers. The output of the WDM 62 is to photodetectors 64, there being one photodetector per channel or fiber. At the input of each of the photodetectors 64 is a photodetector pigtail each of which presents roughly a 1 dB loss to the system. At the detector 64, the system again becomes electrical and the output from the detector 64 is an electrical signal to the signal conditioning circuitry 66 which prepares the signal in standard manner for input into the video monitor 70 via 75-ohm BNC connectors 68. DIN connectors of course may be employed as well.

This type of system may be used for a number of applications including red green blue (RGB) color systems, CCTV, and computer aided design (CAD). The modulation technique for RGB video may preferably be analog whereas another preferred modulation technique for CAD is digital. The present invention is capable of handling both simultaneously as well. The number of channels that may be implemented in the system depicted in FIG. 2 may be up to six channels, based on present technology. In other words six different wavelength carriers for carrying the information from each of the respective channels may be employed. However, the improvement of wavelength-shift control of LDs, and improvement of holographic grating technology, may easily increase the potential number of wavelength channels up to 20. The bandwidth of the RGB and CCTV systems is in the range 10-30 MHz and for CAD is in the range 50-100 MB/s. Typical RGB or CCTV may be found in financial trading firms for real time market data transfer, security systems employing cameras, and information systems. CAD based systems, for example, would be used extensively in the aerospace industry and in university campuses.

The system described in FIG. 2 has extremely good power budget. The basic components contributing to loss present in the system are the laser pigtails 46 ($\sim 1$ dB), photo detector pigtails 63 ($\sim 1$ dB), multimode fiber 56 ($\sim 6$ dB/km), and the two WDMs ($\sim 3$ dB each). In this embodiment, the typical total power loss of these elements will be 10-15 dB. This yields approximately a 20-25 dB power margin. Taking into account wavelength shift, discussed in detail below, losses still remain between 17-22 dB. Additional connecting losses due to the couplers between the 100/140 and 200/380 multimode fibers are 11 dB but total power margin still remains above 10 dB which is unexpectedly high for this type of system.

Figure 4:
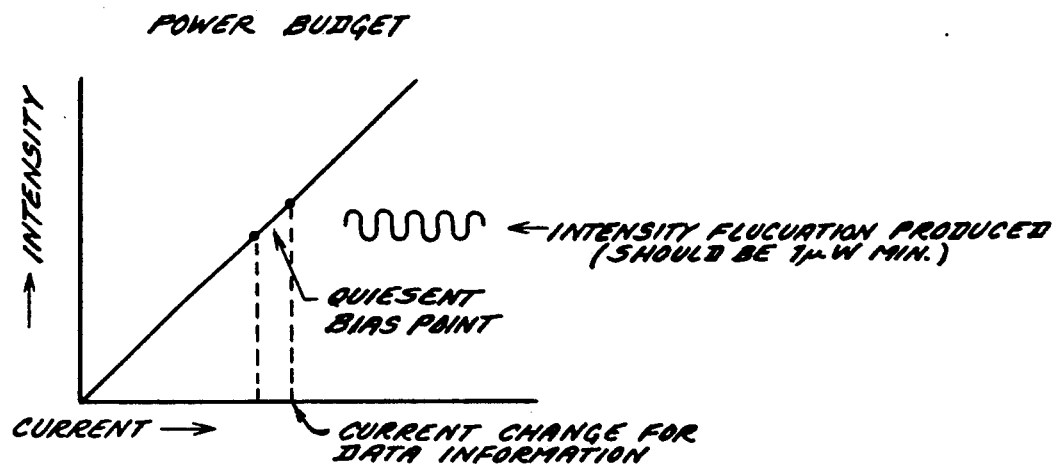
FIG. 4 is a graph depicting power budget.

Power budget is depicted in FIG. 4 which shows intensity versus current, and modulation depth. Power budget is calculated by subtracting (in dB) sensitivity of the detector from power of the source. Power margin is power budget after power losses are subtracted. But these calculations only represent DC budget while AC is of primary interest because of finite source rise times. If a source is too slow it is unable to raise system power to the maximum available. Thus, AC power budget might be less than DC budget and should be taken into account.

Another limiting factor is dispersion. Light waves traveling in a multi-mode fiber travel at different angles within the fiber which causes them to travel at different speeds and thus disperse. This is called multi-mode dispersion, and is of real concern above 100 MHz, for fiber lengths of the order of a few kilometers.

Input power to the laser pigtail is approximately 2 mw, to the multiplexing fiber is 1 mw, to the multimode transmission line is 900 $\mu$w, to the demultiplexing fiber is 250 $\mu$w, to the detector pigtail is 125 $\mu$w, and to the detector is 120 $\mu$w. When calculating detected power at the photodetector, it must be realized that this is a continuous intensity and produces only a D.C. voltage, i.e., nonvarying electrical output. By using the present invention, the efficiency of the system allows the depth of modulation to be very small. The amount of detected modulation intensity is approximately 1 $\mu$w for a shot raise limited system.

Figure 5:
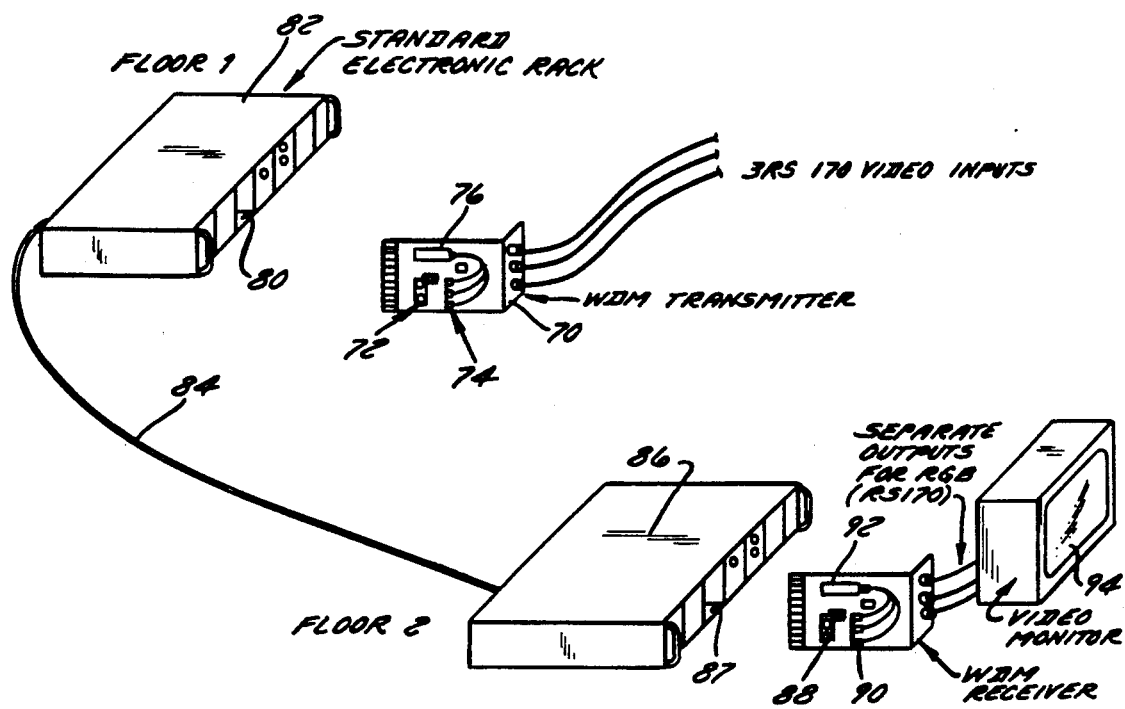
FIG. 5 is a schematic of the transmitter and receiver portions of a link in accordance with the present invention.

In use, as shown in FIG. 5, the system described may be used in a real-time market analysis operation by plugging a module 70 (an APC board which may be compatible with Europackaging standards) containing the transmitter component circuitry 72, LDs 74, and WDM 76, into slot 80 (+12 v) of standard electronics rack 82 of the trading computer electronics. The video signal is sent from the transmitter via multimode fiber 84 between potentially many floors in the trading offices and received by the receiver in rack 86 containing slot 87, electronics 88, detectors 90, and WDDM 92, converted into electrical signals and then inputted to a video monitor trading display 94. State of the art techniques send the same signal either through a TDM system which has significant transparency problems or through three fibers with obvious space and cost constraints. Of course, the video inputs and outputs of the system are standard base-band and comply with the RS170 standard.

Figure 6A:
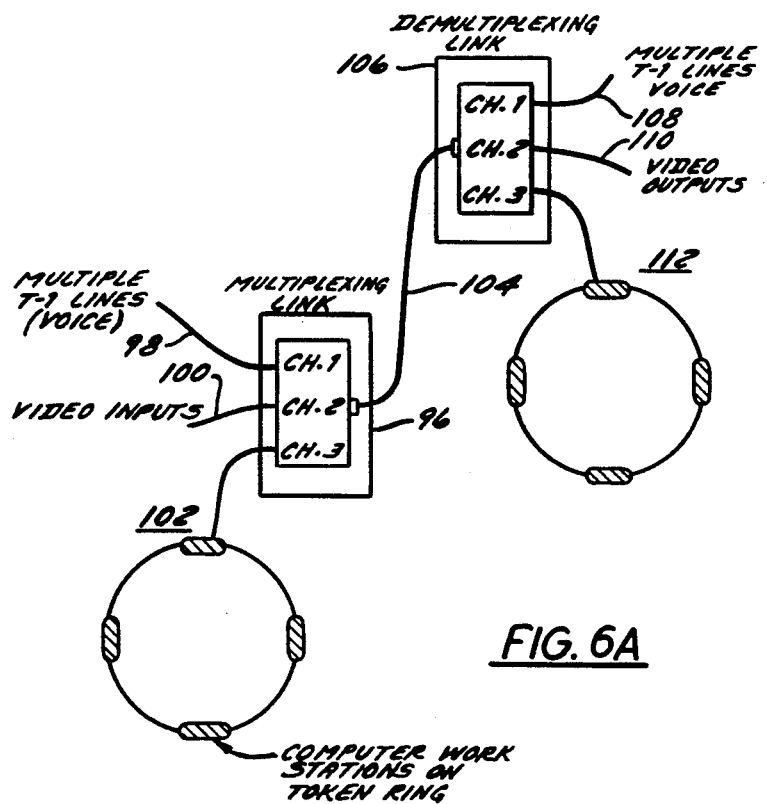
FIGS. 6A & 6B are schematics of an ISDN system and a remote workstation system in accordance with the present invention.

FIG. 6A illustrates an ISDN implementation of the present invention. The three channel system has dedicated channels for voice, video and a computer network. Multiplexing link 96 contains inputs for voice signals 98, video signals 100, and computer work stations 102 connected by, for example, token ring. The signals are fed into link 96, converted into light waves and multiplexed onto a single multimode fiber 104 and fed to demultiplexing link 106. Link 106 demultiplexes the light signals and converts each to its respective electrical signal and then outputs them at output 108 for voice, 110 for video and 112 for computer networking.

Figure 6B:
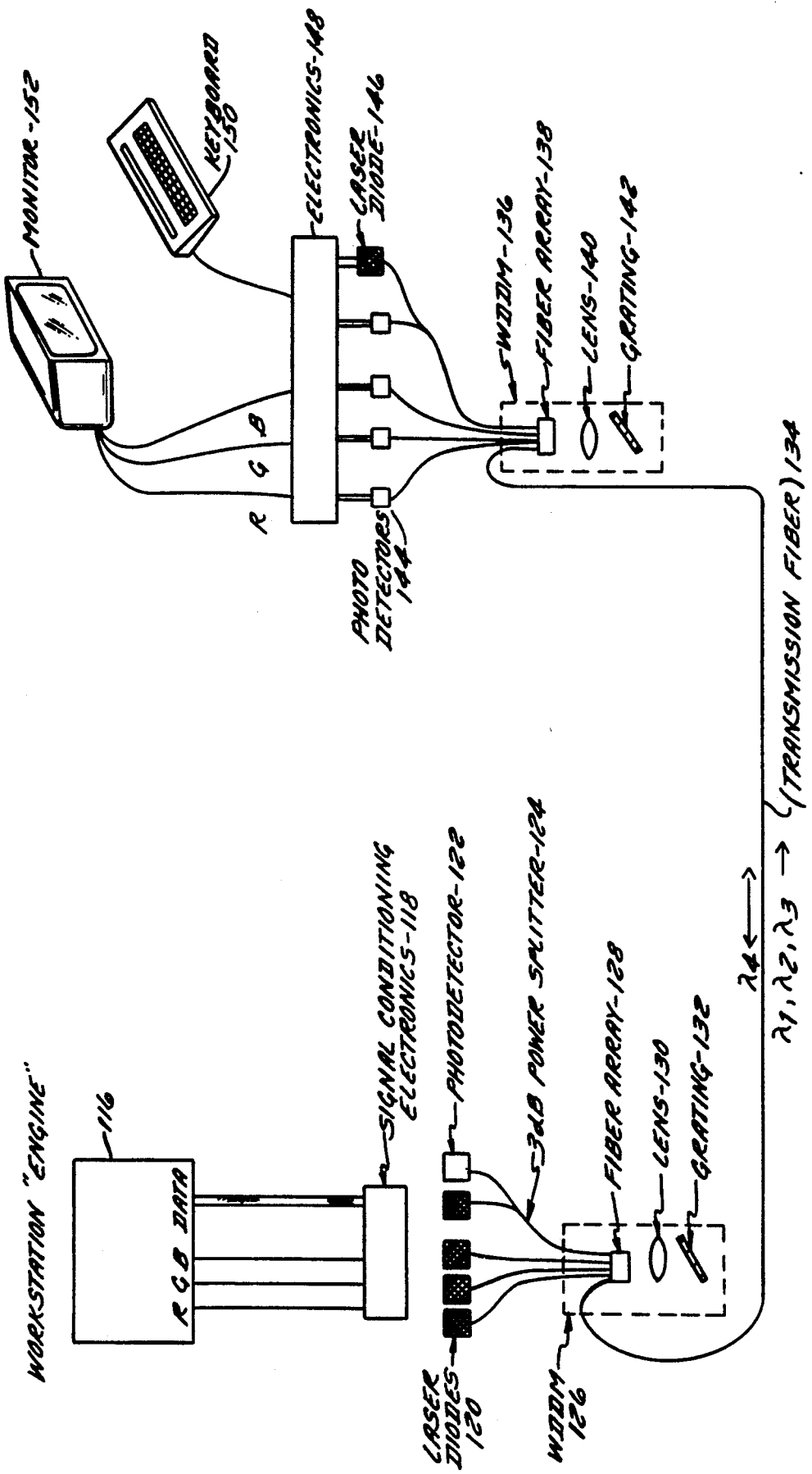
Figure 7A:
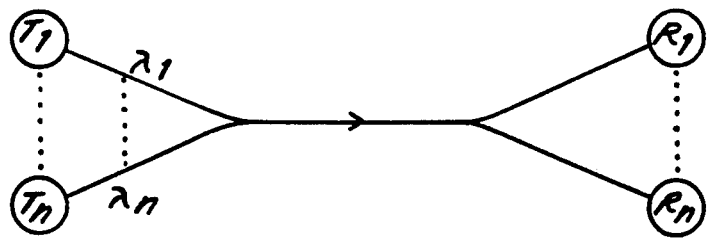
FIGS. 7A–7D are schematics of various WDM architectures of the present invention.
Figure 7B:
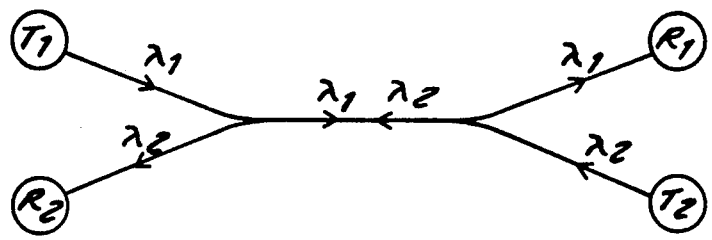
Figure 7C:
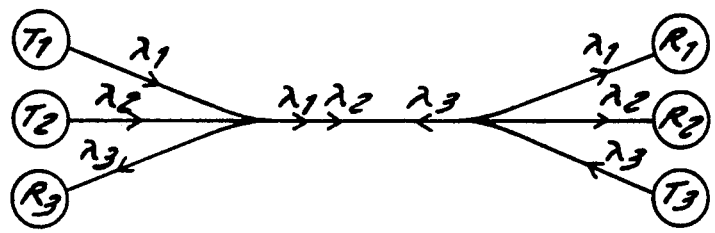
Figure 7D:
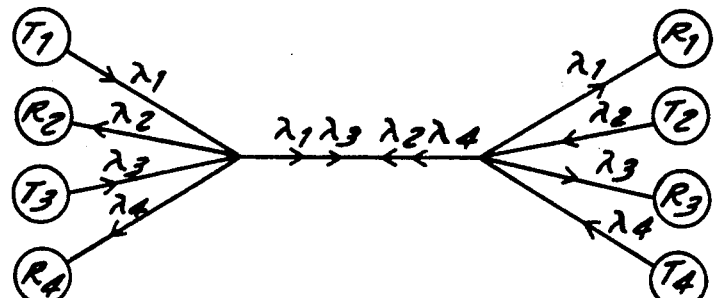

FIG. 6B shows a remote computer workstation arrangement achieved by use of the present invention. Current methods require the use of 5 fibers between the monitor/keyboard and the workstation. The system in FIG. 6B comprises workstation 116, signal conditioning electronics 118, laser diodes 120, photodetector 122, 3 dB power splitter 124, WDM 126 having fiber array 128, lens 130, and grating 132. The work station is connected via the transmission fiber 134 to a WDDM 136 having fiber array 138, lens 140 and grating 142. WDDM 136 is connected to multiple photodetectors 144 and laser diode 146 which in turn are connected to electronics 148 to which are connected keyboard 150 and monitor 152. The lines designated RGB on workstation 116 are for transmission of data from workstation 116 to the user at monitor 152 and keyboard 150. The two lines marked DATA are for bidirectional data transfer at a digital rate of 19.2 kB/s. The RGB lines are run at 35–50 mHz. By using the arrangement in FIG. 6B only one fiber is needed to place a workstation at a remote location greatly reducing costs by eliminating four fibers currently used along with their associated connectors and packaging.

It can be seen that WDM affords an additional degree of freedom in the invention. In the context of space multiplexing, WDM is competitive with current systems in the sense that fewer fibers are required but complementary in the sense that each fiber may carry more than one signal and with greater total bandwidth. In the context of TDM, the WDM link is competitive in the sense that WDM is able to handle more than one channel but complementary in that TDM can be used in a WDM system to further increase system flexibility.

Figure 8:
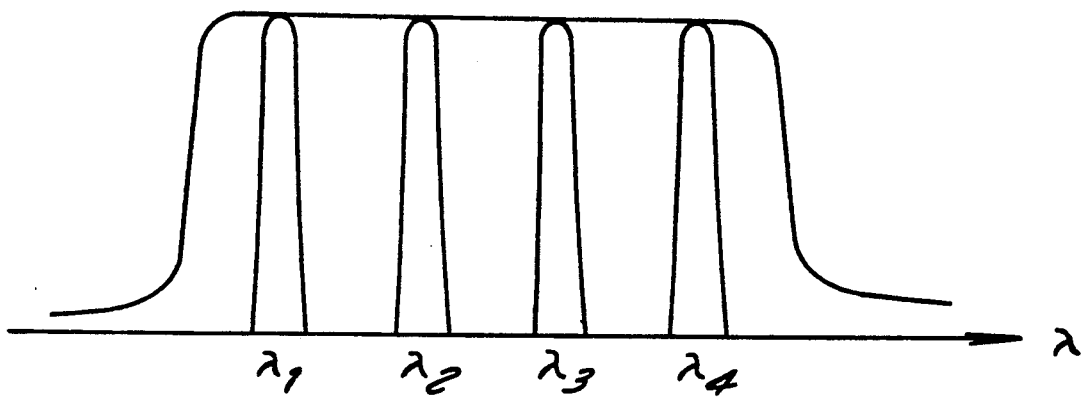
FIG. 8 is a graph plotting source linewidth, or, alternatively, wavelength shifts, versus grating spectral characteristics.

Contrary to a TDM system which requires high speed sources, high speed detectors, and different signals of different channels to be electrically multiplexed, thereby making full transparency unachievable, the present invention can transfer 2–6 channels of information, comprising both analog and digital signals with nearly full transparency. A number of different formats may be employed for 2–6 channel operation, or more if the state of the art of light sources improves. As shown in FIGS. 7A–D the present invention can be employed as a 2–6 channel unidirectional system (FIG. 7A), where T is a transmitter, R denotes its receiver, and $\lambda_n$ the wavelength of each, a 2 channel bidirectional system (FIG. 7B), a 3 channel bidirectional system (FIG. 7C) and a 4 channel bidirectional system (7D) as well as other combinations of these architectures. This flexibility o design and implementation is due to the physical independence of different channels in the present invention due to the different wavelengths that are used to transfer the information ($\lambda_n$) and the highly efficient manipulation of those light signals by the reflection WDM grating having broad uniform wavelength characteristics, and a WDM system based on paraxial optics transmission geometry. FIG. 8 depicts wavelength separation of $\lambda_1 - \lambda_4$ in FIG. 7D for instance. Wavelength separation between channels traveling in the same direction must typically be greater than that for two channels traveling in opposite directions to avoid cross-talk. Low cost and standard fiber optic and light source components such as CD LDs and standard multimode fibers may be used.

Figure 9:
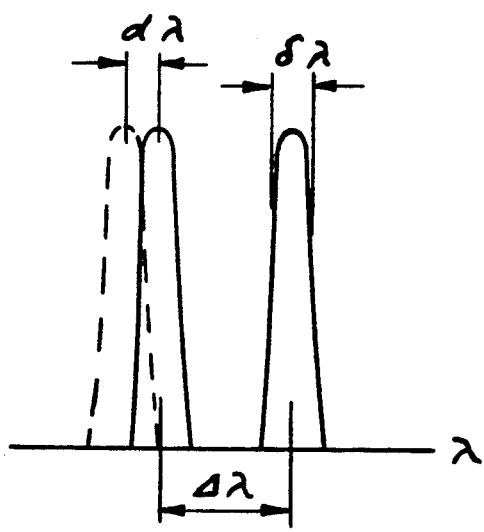
FIG. 9 is a graph plotting source wavelength shift, $\delta\lambda$, linewidth $\delta\lambda$ and wavelength separation $\Delta\lambda$.

In order to more fully understand the merits of the combination of the present invention and the invention's tolerance to loss of WDM optical efficiency due to wavelength shift of LDs, the trade off between optical losses and cross-talk is discussed. In FIG. 9, wavelength shift $d\lambda$, source linewidth $\delta\lambda$, and wavelength separation $\Delta\lambda$ are depicted. $\Delta\lambda$ is the separation between the center wavelength of the LD (or ELEDs) $\delta\lambda$ is the width of the spectrum of a LD or ELED, and is typically greater for LEDs than for LDs, which typically necessitate a greater $\Delta\lambda$ for LED systems (and will be assumed to be zero for the LD case here). $d\lambda$ is the variation in the center wavelength of the LD or LED and is typically greater for LDs than for LEDs or ELEDs (and will be assumed to be zero for the ELED case below). Subsequently, the adverse effects on performance in the case of ELEDs, due to a non zero $\delta\lambda$ (line width) is discussed where $d\lambda$ (shift) is ignored because LEDs have little wavelength shift. For complete and accurate analysis one may assume that both $\delta\lambda$ and $d\lambda$ are non-zero in the same model even though they are secondary effects. For sake of analytic clarity of evaluation, that is not done here.

There are a number of factors creating LD wavelength shift. Each of these is discussed in detail because they are critical to wavelength sensitive fiber optic WDM systems. For sake of simplicity it is assumed here that the LDs are single longitudinal mode, that is, typical 1–3 nm LD linewidths are ignored, i.e. $\delta\lambda = 0$. Furthermore, a 2 dB WDM loss (for zero wavelength shift) is assumed and only for a WDM employing a volume holographic grating with high (greater than 90%) diffraction efficiency within the spectrum of interest. In other cases, this loss will be higher (say, 5 dB) but what is essential is the substantial uniformity of the grating's wavelength characteristics in the spectrum of interest. The assumption that the LD is single mode is proper even though an LD linewidth can be 1 nm or slightly more since a number of longitudinal modes are excited. In the background discussion above, wavelength shift was assumed to be zero as in the article, B. Moslehi, et al., "Fiber Optic Wavelength Division Multiplexing Using Volume Holographic Gratings," 14 Optics Lett. 1088 (1989) incorporated by reference herein. For wavelength sensitive information transfer, however, such as in RGB or other video, it is necessary to consider a non-zero $d\lambda$. The link of the present invention is able to minimize the effects of wavelength shift thus offering unexpectedly high performance even in the presence of a shifting wavelength source.

Thus, we assume for now that $\delta\lambda=0$ and we proceed to define the wavelength shift parameter:

$$k = \frac{d\lambda}{\Delta\lambda} \quad \text{(Eq. 1)}$$

Then, the optical efficiency loss due to wavelength shift is $$\zeta_D = 1 - \frac{b \cdot k}{d} \quad \text{(Eq. 2)}$$

or, in decimal logarithmic units, $$L_D = -10 \log_{10} \zeta_D \, [dB] \quad \text{(eq. 3)}.$$

Assuming that the fibers are packed closely together, b is also the cladding diameter. It can be seen that both core and cladding diameters are critical. This is because the jacket of the fiber is preferably stripped to allow the fibers to be placed together as closely as possible to achieve paraxiality. Thus the cladding diameter is the determinative factor with respect to paraxiality.

For typical fibers, the core/cladding ration is: 50/125 $\mu$, 62.5/125 and 100/140, 200/380. Thus, usually, $$\frac{b}{d} \approx 2. \quad \text{(Eq. 4)}$$

Eq. 2 then takes the form $$\zeta_D = 1 - 2k \quad \text{(Eq. 5)}.$$

Figure 10:
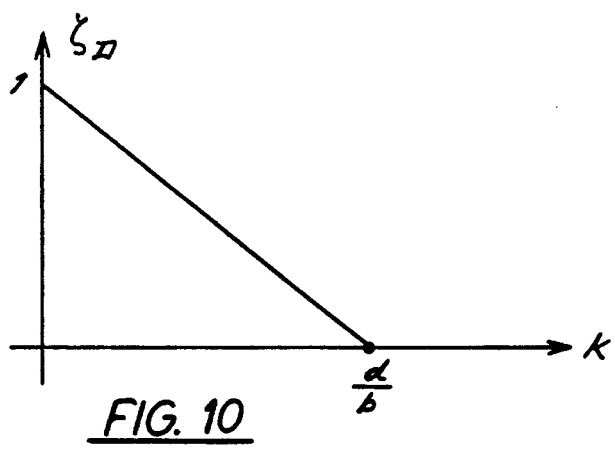
FIG. 10 is a graph plotting efficiency $\xi$ versus k.
Figure 11:
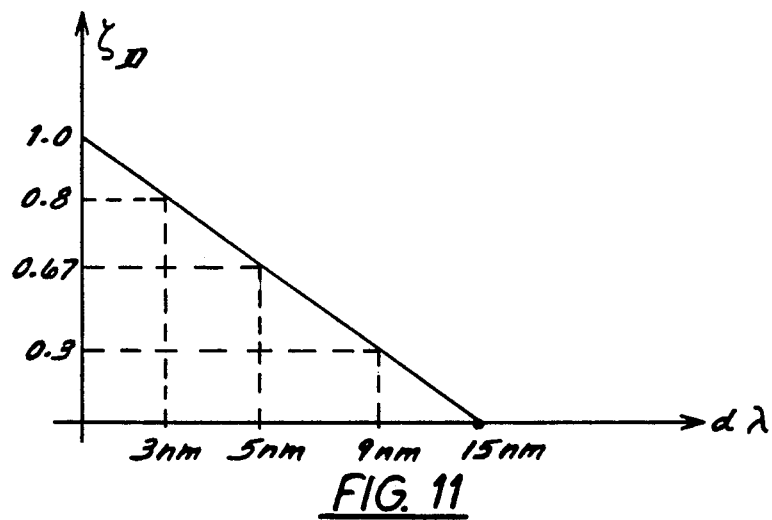
FIG. 11 is a graph plotting efficiency, $\xi$ versus d$\lambda$.
Figure 12A:
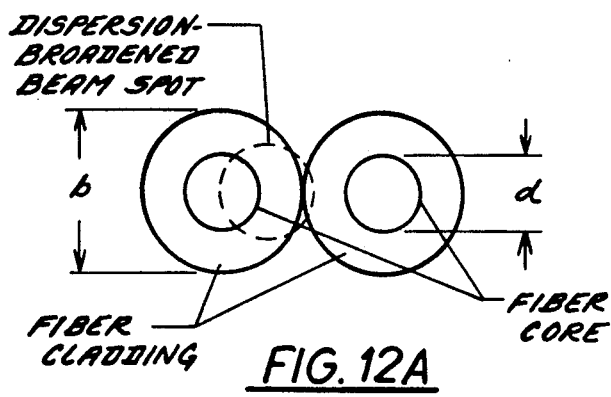
FIGS. 12A and 12B depict fiber wire light misalignment.
Figure 12B:
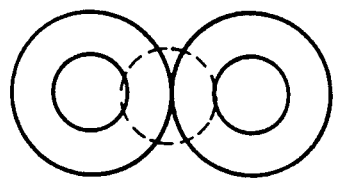

Eq. 2 is illustrated in FIG. 10, while Eq. 5, for $\Delta\lambda=30$ nm, is illustrated in FIG. 11. FIGS. 10 and 11 depict the total loss of the optical signal for $d\lambda \leq 15$ nm due to misalignment of the signal beam and the output fiber as shown in FIGS. 12A and 12B. FIG. 12A shows partial misalignment ($\xi_D > 0$) and FIG. 12B shows total misalignment ($\xi_D=0$). The results are also illustrated in Table 1 for The total loss, $L_T$ is calculated form the formula $$L_T = L_D + 2 \, dB \quad \text{(Eq. 6)}$$

where 2 dB represents a rough estimation of additional losses such as Fresnel loss, diffraction inefficiencies, etc.

Figure 13:
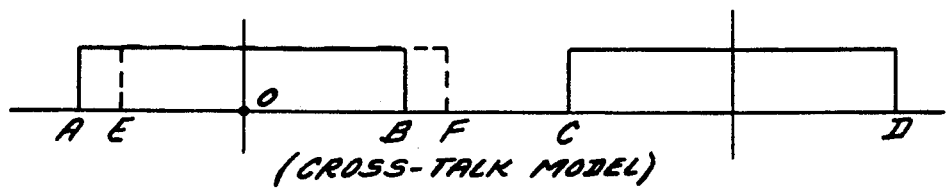
FIG. 13 illustrates a rectangular ID model for cross-talk calculation.

Formulation and discussion of a model of cross-talk is necessary to fully analyze the merits of the claimed data link. Using the 1 D rectangular model as shown in FIG. 13 we have $$g = \frac{OF}{OC} = \frac{\delta\beta\lambda + \frac{\delta\alpha}{2}}{\Delta\beta - \frac{\delta\alpha}{2}} = \frac{\frac{b \cdot k}{f} + \frac{d}{2f}}{\frac{b}{f} - \frac{d}{2f}} = \frac{bk + \frac{d}{2}}{b - \frac{d}{2}}. \quad \text{(Eq. 7)}$$

To avoid cross-talk then it is necessary that $$g \leq 1 \quad \text{(Eq. 8)}.$$

Rewriting Eq. 7 in the form $$g = \frac{k + \frac{d}{2b}}{1 - \frac{d}{2b}} \quad \text{(Eq. 9)}$$

and setting $g=1$, we obtain $$\left(\frac{b}{d}\right)_c = \frac{1}{1 - k}. \quad \text{(Eq. 10)}$$

And, to avoid cross talk, $$\frac{b}{d} > \left(\frac{b}{d}\right)_c. \quad \text{(Eq. 11)}$$

The minimum loss, $L_D$ min, occurs for $$\frac{b}{d} = \left(\frac{b}{d}\right)_c.$$

Then, cross talk is at the edge of acceptability, and $$\zeta_{Dmax} = 1 - \left(\frac{b}{d}\right)_c \cdot k = 1 - \frac{k}{1-k} = \frac{1-2k}{1-k}. \quad \text{(Eq. 12)}$$

Equation 12 is illustrated in Table 2 set out here.

TABLE 1

$\frac{b}{d} = 2, \zeta_D = 1 - 2k, \Delta\lambda = 30$ nm, $k = \frac{d\lambda}{\Delta\lambda}$, $L_D[dB] = -10 \log_{10}\zeta_D$:

| $d\lambda$ | 1 nm | 2 nm | 3 nm | 4 nm | 5 nm | 6 nm | 7 nm | 8 nm | 9 nm | 10 nm |
|---|---|---|---|---|---|---|---|---|---|---|
| k | 0.03 | 0.06 | 0.1 | 0.13 | 0.15 | 0.2 | 0.23 | 0.27 | 0.3 | 0.22 |
| $\zeta$ | 93% | 86% | 80% | 73% | 67% | 60% | 53% | 47% | 40% | 33% |
| $L_D$[dB] | 0.3 | 0.65 | 1.0 | 1.36 | 1.73 | 2.2 | 2.75 | 3.27 | 4.0 | 4.8 |
| $L_T$[dB] | 2.3 | 2.65 | 3.0 | 3.36 | 3.73 | 4.2 | 4.75 | 5.27 | 6.0 | 6.8 |

TABLE 2

| $\Delta\lambda$ | 30 nm | 30 nm | 30 nm | 30 nm | 30 nm | 30 nm | 30 nm | 30 nm | 30 nm | 30 nm |
|---|---|---|---|---|---|---|---|---|---|---|
| $d\lambda$ | 1 nm | 2 nm | 3 nm | 4 nm | 5 nm | 6 nm | 7 nm | 8 nm | 9 nm | 10 nm |
| k | 0.03 | 0.06 | 0.1 | 0.13 | 0.15 | 0.2 | 0.23 | 0.27 | 0.3 | 0.33 |
| $\left(\frac{b}{d}\right)_c$ | 1.03 | 1.06 | 1.11 | 1.15 | 1.18 | 1.25 | 1.3 | 1.4 | 1.43 | 1.5 |

TABLE 2-continued

| ($\zeta_D$)min | 97% | 94% | 88% | 85% | 82% | 75% | 70% | 62% | 57% | 50% |
|---|---|---|---|---|---|---|---|---|---|---|
| ($L_D$)min [dB] | 0.1 | 0.2 | 0.5 | 0.7 | 0.86 | 1.2 | 1.5 | 2.0 | 2.4 | 3.0 |
| ($L_T$)min [dB] | 2.1 | 2.2 | 2.5 | 2.7 | 2.86 | 3.2 | 3.5 | 4.0 | 4.4 | 5.0 |

From Table 2 it can be seen that the minimum loss, ($L_D$)min, is quite low, and total loss, ($L_T$)min, is lower than 5 dB, even for wavelength shift of $d\lambda=10$ nm. Now, comparing four fibers of the present invention from the point of view of Eq. 10, and assuming that $$\frac{b}{d} = \left(\frac{b}{d}\right)_c \quad \text{(Eq. 13)}$$

we find the critical $k_c$ value form the relation $$\left(\frac{b}{d}\right)_c = \frac{1}{1-k} \quad k_c = 1 - \left(\frac{d}{b}\right)_c \quad \text{(Eq. 14)}$$

and $$(d\lambda)_c = k_c \Delta\lambda \quad (Eq.\ 15)$$

It can be seen that for $$(d\lambda) < (d\lambda)_c \quad (Eq.\ 16)$$

cross talk can be ignored. $(L_D)_c$ and $(L_T)_c$ for $(d\lambda)=(d\lambda)_c$ can be calculated and illustrated as in Table 3 below.

TABLE 3

| Fibers | $\frac{d}{b}$ [$\mu$m] | $\frac{b}{d}$ | k | $(d\lambda)_c$ | $\zeta$ | L |
|---|---|---|---|---|---|---|
| A | 200/380 | 1.9 | 0.47 | 14.1 nm | 10% | 10 dB |
| B | 62.5/125 | 2 | 0.5 | 15 nm | N/A | ∞ |
| C | 50/125 | 2.5 | 0.6 | 18 nm | N/A | ∞ |
| D | 100/140 | 1.4 | 0.28 | 8.4 nm | 60% | 2.2 dB |

From Table 3 it can be seen that for fibers 62.5/125 and 50/125, cross-talk is not a limitation and very high wavelength shifts (greater than 10 nm) can be tolerated assuming that loss is acceptable. For 200/300 fiber, however, wavelength shift must be less than 14 nm in order to avoid cross talk, and for 100/140 fiber, wavelength shift must be less than 8 nm in order to avoid cross talk. In summary, for 200/380 fiber and for $d\lambda=14$ nm, $L_D=10$ dB and $L_T=12$ dB without cross talk. For 100/140 fiber and for $d\lambda=8$ nm, $L_D=2$ dB and $L_T=4$ dB. It can be seen from the above that the multiwavelength data communication link of the present invention can achieve high $\xi_D$ and low cross-talk even for high wavelength shifts assuming the optimized b/d ratio, close to $$\left(\frac{b}{d}\right)_c,$$

given in Tables 2 and 3 is followed.

For a given wavelength shift, the b/d ratio should be slightly higher than the $b/d_c$ ratio and therefore the fiber parameters adjusted for wavelength shift. This is illustrated in Eq. 16. For a given k (i.e., wavelength separation, $\Delta\lambda$, and wavelength shift, $d\lambda$), the critical geometric ratio of the fiber parameters $d/b_c$ can be found and from these parameters the $k_c$ parameter can be found. Using the value of the $k_c$ parameter and $\Delta\lambda$ the critical $(d\lambda)_c$ can be fond. According to Eq. 16, if wavelength shift is smaller than $d/\lambda_c$ significant cross-talk can be avoided.

For example, referring again to Table 2, for $\Delta\lambda=30$ nm and $d\lambda=8$ nm, $k=0.27$ and $b/d_c=1.4$. It then follows that for any fibers with $b/d > b/d_c$, and for $d\lambda \leq 8$ nm cross-talk is avoided. If the fiber of interest has the required critical parameters, then its loss will be minimal ($L_D$min=2.4 dB, and $L_T$min=4.4 dB) and significant cross-talk may still avoided even for wavelength shift as high as $d\lambda=8$ nm.

Figure 14:
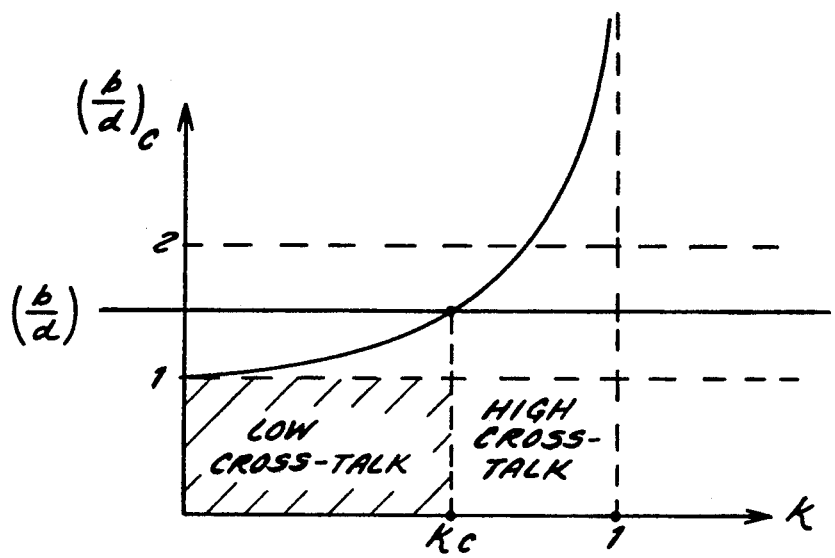
FIG. 14 illustrates cross-talk optimization, according to Eq. 14.

Eq. 14 has been illustrated in FIG. 14. It is seen that the actual fiber value of b/d determines $k_c$ and that for $k<k_c$ we have low cross-talk, while for $k>k_c$ the cross-talk is high. $k=k_c$ is the optimum case from the point of view of minimization of cross-talk and insertion loss due to wavelength shift, and misalignment, illustrated in FIG. 12.

Using Eq. 12, we obtain $$k = k_o = \frac{1 - \zeta_D}{2 - \zeta_D}. \quad \text{(Eq. 17)}$$

Figure 15:
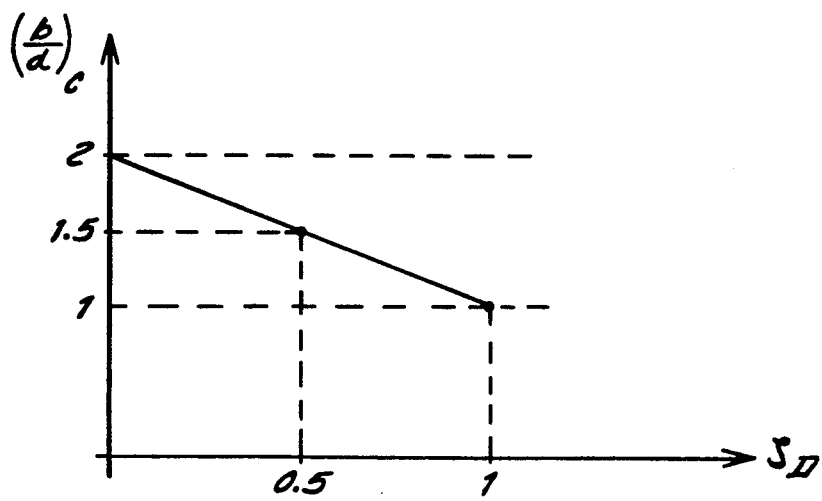
FIG. 15 illustrates cross-talk optimization, according to Eq. 18.

This equation allows calculation of acceptable wavelength shift, for predetermined insertion loss. For example, for $\xi_D=0.5$, and $L_D=3$ dB (equivalent to $L_T=5$ dB, according to Eq. 6), we obtain $k_o=0.33$, which, for $\Delta\lambda=30$ nm, gives $(\delta\lambda)_o=k_o \Delta\lambda=10$ nm. On the other hand, combining Eqs. 10, and 17, we obtain $$\left(\frac{b}{d}\right)_c = 2 - \zeta_D \quad \text{(Eq. 18)}$$

illustrated in FIG. 15. It is seen that, for $\xi_D=0.5$ (and $L_D=3$ dB), $b/d_c=15$. It should be emphasized that these results are only approximate because the 1 D rectangular cross-talk model, illustrated in FIG. 13 is used.

The following example illustrates the optimization principle, discussed above. Assuming, that WDM dispersion loss of 3 dB is acceptable, the fiber should have b/d ratio of 1.5, close to that of 100/140 $\mu$-fiber (see Table 3). If, however, the actual fiber will have $b/d=2$, such as 62.5/125 fiber, the dispersion loss will be higher, since $L_D=5$ dB. This optimization principle is illustrated in Table 4, were optimized valued of $L_D$, K, $(d\lambda)$, and $b/d_c$, are compared in a modified version of Table 2.

TABLE 4

| $\Delta\lambda$ | 30 nm | 30 nm | 30 nm | 30 nm | 30 nm | 30 nm | 30 nm |
|---|---|---|---|---|---|---|---|
| $\zeta$ | 0.8 | 0.7 | 0.6 | 0.5 | 0.4 | 0.3 | 0.2 |
| L | 1 dB | 1.5 dB | 2.2 dB | 3 dB | 4 dB | 5 dB | 7 dB |
| k | 0.17 | 0.23 | 0.28 | 0.33 | 0.37 | 0.41 | 0.44 |
| $(d\lambda)$ | 5 nm | 7 nm | 9 nm | 10 nm | 11 nm | 12 nm | 13 nm |

TABLE 4-continued

| $\left(\dfrac{b}{d}\right)_c$ | 1.2 | 1.3 | 1.4 | 1.5 | 1.6 | 1.7 | 1.8 |
|---|---|---|---|---|---|---|---|

According to Table 4, we can either adjust the fiber's b/d ratio, to a predetermined maximum wavelength shift, or select acceptable wavelength shift for the actual fiber. For example, for 100/140 fiber, we have b/d=1.4, and according to Table 4, the maximum wavelength-shift, in order to minimize dispersion loss, is 8.6 nm, for $L_D$=2.2 dB, and $L_T$=4.2 dB. Of course, the optimum b/d-ratio, can always be adjusted either by removing part of the cladding (if b/d>b/$d_c$, or using spacer elements if b/d<b/$d_c$.

The presented optimization procedure determines the optimum WDM design, according to given LDs and system geometrical tolerance, defined by maximum wavelength shift, $d\lambda_o$, and optimum fiber b/d-ratio, defined by b/$d_c$, according to Tables 1-4, and Eqs. 1-18. Since, the WDM grating and WDM lens are also optimized, this procedure optimizes all basic components of the WDM system, from the point of view of dispersion loss and cross-talk minimization.

Eqs. 10, 17, and 18 are the basis for an optimization formula that allows for the minimization of loss, $L_D$, for a given wavelength shift. The multiwavelength data communication link of the present invention may preferably be designed according to the following:

1. Assuming that the system has wavelength shift not larger than $d\lambda = d\lambda_c$, the coefficient $k = k_o$ is calculated for a given $d\lambda$;
2. Using Eq. 10 the optimum fiber geometry b/$d_c$ is found. Then, for b/d=b/$d_c$, the system will have the minimum loss $(L_D)$min within wavelength shifts $d\lambda \leq d\lambda_c$ still preserving low cross talk;
3. If b/d>b/$d_c$, then the system has higher than minimum loss $(L_D)>(L_D)$min, within wavelength shifts $d\lambda \leq d\lambda_c$.

Of course, wavelength shift cannot be totally eliminated because it is caused by many changing factors such as temperature, aging, fiber geometry tolerance, current modulation, source pigtailing feedback, and many others. The above optimization, however, may minimize wavelength shift in the system of the present invention providing unexpected superior performance. Furthermore the condition $d\lambda = 0$ occurs where the optimum alignment of the fiber array, lens, and grating are in paraxial alignment as shown in FIG. 3 and, in a preferred embodiment, as shown in U.S. Pat. No. 4,926,412 and the reference B. Moslehi, et al., Optics Letters, 14, 1088 (1989). The multiwavelength data communication link of the present invention is able to minimize the effects of wavelength shift because of the particular combination of mature CD LD technology, within the single transmission window 750 nm to 850 nm, the use of standard multimode fibers, and the paraxial structure of the WDM including the fiber grouping, lens, and grating, be it holographic, including nonuniform volume holographic gratings, or a photoresist grating. It should be noted that the optimization procedure, determined by Eqs. 1-18, is independent of absolute LD wavelength values.

A multiwavelength data communication link using an edge limiting LED (ELED) is now discussed. In the above discussion of LDs, it was assumed that the LDs were single mode, i.e., $\lambda\delta=0$. In the discussion of the ELED case in which the line width of the source cannot be ignored readily as in the LD case, we take into account line widths of between 50-60 nm for ELEDs. Now, however, wavelength shift, $d\lambda$, is assumed to be zero because LEDs in general suffer very little from this effect.

The first use of ELEDs in the present invention is only slightly different than the use of LDs, analyzed by Eqs. 1-18. In the ELED case we replace Eq. 5, by the following equation:

$$\xi_D - 1 - k' \quad (Eq.\ 19)$$

where, instead of Eq. 1 we have, $$k' = \frac{\delta\lambda}{\Delta\lambda} \quad (Eq.\ 20)$$

and wavelength linewidth, $\delta\lambda$, is illustrated by FIG. 9 (here, customary to LDs, $d\lambda = 0$). The equivalent of Eq. 10 has similar form, $$\left(\frac{b}{d}\right)_c = \frac{1}{1 - k'} \quad (Eq.\ 21)$$

Therefore, the optimization analysis is similar to that for LDs, except $d\lambda$ is replaced by $\delta\lambda$, and k by k'. Assuming $L_D$=3 dB, we obtain from Eq. 19, k'=0.5, and, according to Eq. 21, b/$d_c$=2. Now, however, the wavelength separation, $\Delta\lambda$, must be made larger since for $\delta\lambda$=40 nm, $\Delta\lambda$=80 nm.

The second use of ELEDs in the present invention is such that the WDM is used to filter out all but preferably the center frequency of each of the ELEDs used as sources. The WDM may also be used to filter out all but a frequency slightly off center of each of the ELEDs with satisfactory results but with some power loss. This filtering ability of the WDM is extremely advantageous because it results in an effective $\delta\lambda$ that is smaller than $\delta\lambda$ of the ELED itself. This sampling or slicing of LED spectra is illustrated in FIG. 16A which shows the spectra for three ELEDs filtered by the WDM leaving only the center frequency for use in the data link.

Figure 16B:
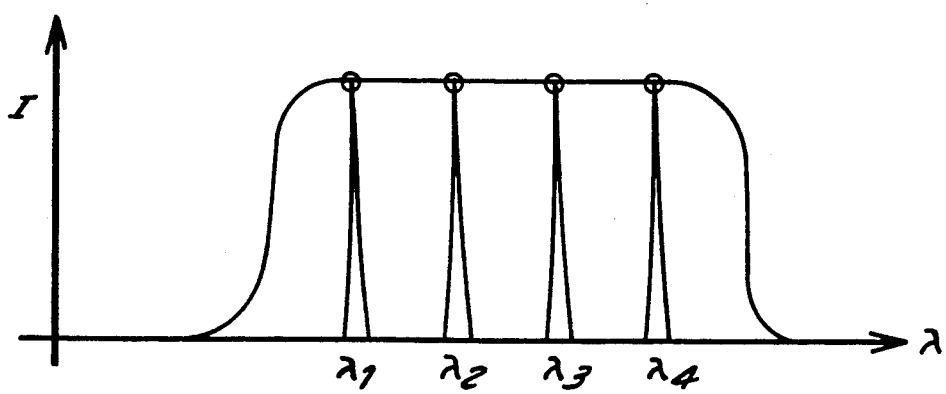

It can be seen that for each of the LEDs $\delta\lambda$, the region surrounding the central wavelength $\lambda 1$, $\lambda 2$, or $\lambda 3$, is far smaller than the full, unfiltered spectrum of the ELED. As seen in FIG. 16B, when the filtered central wavelengths of each of the LEDs is multiplexed, the small $\delta\lambda$ of each allows close juxtaposition of each of the carriers in wavelength. In this example, $\lambda 1$, $\lambda 2$, and $\lambda 3$ may equal 1300, 1330, and 1360 nm. Therefore, the distance $\Delta\lambda$ between the central frequencies of each of the filter LED spectra is on the order of about 30 nm rather than, in an unfiltered case, hundreds of nm.

An analysis of the filtering effect of the ELED multiwavelength data communication link of the present invention is now discussed. There are basically two types of LEDs, surface emitting LEDs (conventional) having wavelengths located typically at 800 nm and at 1.3 $\mu$, Lambertian type spectra, and broad line widths, $\delta\lambda$, up to 200 nm. The second type of LED is the ELED which has wavelengths at 1.3 $\mu$ and narrower line widths of about 60 nm and recently down to 40 nm. ELEDs are not Lambertian in nature and have typical divergences of 30° by 120°. Therefore, coupling efficiency $\xi$ of ELEDs is much higher than conventional LEDs. Coupling efficiency $\xi$ is given by the following equation $$\zeta = \left(\frac{d}{D}\right)^2 \cdot \left(\frac{NA_F}{NA_L}\right)^2 \quad \text{(Eq. 22)}$$

where $NA_F$ is the numerical aperture of a fiber connected to the LED and the lower $NA_L$ is the numerical aperture of the LED itself. In the case where a LED is used, NA for the LED is 1 because it is a Lambertian source. Assuming a typical NA for a fiber is between 0.2 to 0.5, coupling efficiency $\xi$ turns out to be only about 25% (assuming d/D equals roughly 1). In the ELED case, NA is equal to about 0.04 and therefore $\xi$ is much higher.

In the WDM used in the present invention, the source fiber emits light with a divergence determined by the fiber's numerical aperture NA, the light is collimated by the aspheric lens and reflected and dispersed by the grating that is mounted at Littrow angle for the central channel. The reflected light is reflected by the same aspheric lens into one of the receiving fibers in the fiber array determined by the wavelength of the light source.

The fundamental relation between the fiber spacing b, the channel spectral separation $\Delta\lambda$, and the focal length of the lens f can be derived from the basic grating formula for the first-order diffraction:

$$\sin\beta + \sin d = \frac{\lambda}{\Lambda_{//}} \quad \text{(Eq. 23)}$$

where $\lambda$ is the light wavelength in vacuum, $\Lambda_{11}$ is the grating constant, $\alpha$ is the incident angle with respect to the normal to the grating, and $\beta$ is the diffraction angle. At the Littrow configuration, where $\alpha=\beta$, i.e., for a fixed wavelength, the beam is reflected directly backward and the angular distortion of the reflected beam is minimized. If Eq. 23 is differentiated for the fixed wavelength case the following is derived $$\delta\beta \cos\beta + \delta\alpha \cos\alpha = 0 \quad K_\alpha = -\frac{\cos\alpha}{\cos\beta} \sim -1 \quad \text{(Eq. 24)}$$

where $K_\alpha$ is the geometrical magnification coefficient (which indicates that the system is one-to-one imaging system) and $$K_\alpha = \frac{\partial\beta}{\partial\alpha} = -1 \quad \text{(Eq. 25)}$$

and $$2\sin\alpha = 2\sin\beta = \frac{\lambda}{\Lambda_{//}}. \quad \text{(Eq. 26)}$$

Thus, the dispersion factor $K_\lambda$ is shown to be $$K_\lambda = \frac{\partial\beta}{\partial\lambda} = \frac{1}{\cos\beta\Lambda_{//}} = \frac{2\tan\alpha}{\lambda}. \quad \text{(Eq. 27)}$$

Rewriting Eq. 27 for $\Delta\beta$ we get $$\Delta\beta = K_\lambda \Delta\lambda \quad \text{(Eq. 28)}$$

and thus the fiber spacing b (center-to-center) is given by $$b = f\Delta\beta \quad \text{(Eq. 29)}.$$

Using the following equation $$d\beta_\lambda = K_\lambda \delta\lambda_1 = \frac{d}{f} \quad \text{(Eq. 30)}$$

where d is the core diameter, and substituting in Eq. 28 from above, the following is obtained $$\delta\lambda = 2\delta\lambda_1 = 2\frac{d\beta_\lambda}{K_\lambda} = 2\frac{d}{fK_\lambda} = \frac{2d}{f} \frac{\Delta\lambda}{\Delta\beta} = \frac{2d}{f} \frac{f}{b} \Delta\lambda \quad \text{(Eq. 31)}$$

and substituting in Eq. 25, the equation defining k' is obtained:

$$k' = \frac{\delta\lambda}{\Delta\lambda} = \frac{2d_1}{b_1}. \quad \text{(Eq. 32)}$$

If h=1, the relation $$\frac{d_2}{b_2} = h - k'; h = 1 \quad \text{(Eq. 33)}$$

becomes $$\frac{d_2}{b_2} = 1 - k' = 1 - \frac{2d_1}{b_1}. \quad \text{(Eq. 34)}$$

Generally it can e said that to avoid cross-talk $$\frac{d_2}{b_2} \leq 1 - k'.$$

Thus, we obtain the following $$\frac{d_2}{b_2} = 1 - \frac{2d_1}{b_1}. \quad \text{(Eq. 35)}$$

As an example, if $b_1/d_1=4$ and $\Delta\lambda=30$ nm and $\delta\lambda=15$ nm k'=0.5. Substituting k'=0.5 into Eq. 29 we obtain $b_2/d_2=2$. Then knowing that $b_1/f_1=b_2/f_2$ we obtain $f_2/f_1=0.5$. Taking the equation $$\zeta = 1 - \frac{k'}{h} = 1 - k', \quad \text{(Eq. 36)}$$

for k'=0.5, $\xi$=0.5 which is 3 dB.

In order to calculate losses from the first WDM in a link of the present invention the equation $$D\lambda = m\ \delta\lambda + (m-1)\ \Delta\lambda = \Delta\lambda(m''+m-1) \quad \text{(Eq. 37)}$$

is considered where m is the number of channels, $\delta\lambda$ is the channel line width, $\Delta\lambda$ is the wavelength separation, $D\lambda$ is the total linewidth of the m-LEDs that make up the system and $k''=k'/2$. The following equation for loss is obtained $$l = \frac{\Delta\lambda}{D\lambda} = \frac{1}{mk'' + m - 1}. \quad \text{(Eq. 38)}$$

Defining $E_m$, as follows $$E_m = \frac{P_m}{P} = \frac{\delta\lambda}{D\lambda} = \frac{\delta\lambda}{\Delta\lambda} \cdot \frac{\Delta\lambda}{D\lambda} = k'' \cdot l = \frac{k''}{mk'' + m - 1}, \quad \text{(Eq. 39)}$$

For m=3

$$\frac{k''}{3k'' + 2}$$

and for k''=0.25, $E_m$=10 dB.

The filtering effect of the ELED WDM is now described. Taking Eq. 23 again $$\sin\beta + \sin d = \frac{\lambda}{\Lambda_{//}}$$

and obtaining the equation defining Littrow wavelength $$2\sin\alpha = 2\sin\beta = \frac{\lambda_L}{\Lambda_{//}}$$

as discussed earlier for $\lambda_{L1}$=720 nm, $\Delta\lambda$nm=30 nm, $\Delta\beta = K_1 \Delta\lambda$, and knowing that $K_\alpha = -1$ for $\alpha \approx \beta$ we obtain the following equation $$\lambda_{L(m+1)} = \lambda_{Lm} + 2\Delta\lambda \qquad \text{Eq. (40)}$$

which provides solutions to the filtering effect of the WDM for the arrangement shown in FIG. 17 and in Table 5. Assuming that the four fibers illustrated in FIG. 17 carry the following wavelengths 1300, 1330, 1360, and 1390 nm, and assuming the corresponding fibers 1-4 represented in Table 5 act as both input and output fibers a number of interesting effects can be observed. The Littrow wavelengths for each of the fibers 1-4 in FIG. 17 are positioned on the diagonal running from lower left to upper right in Table 5. Thus it can be seen that the Littrow wavelength for fiber 4 is 1480, for fiber 3 is 1420, for fiber 2 is 1360, and for fiber 1 is 1300. The table thus shows that the 1480 nm wavelength traveling in fiber 4 into the multiplexer will be diffracted back into that fiber in accordance with the Littrow equation. The same is true for the other fibers and their respective Littrow wavelengths.

TABLE 5

| FIBER | | | | | |
|---|---|---|---|---|---|
| 4 | | 0 | 1390 | 1410 | 1450 | 1480 |
| 3 | | 0 | 1360 | 1390 | 1420 | 1450 |
| 2 | | 0 | 1330 | 1360 | 1390 | 1420 |
| 1 | → | 0 | 1300 | 1330 | 1360 | 1390 |
| | | 0 | 0 | 0 | 0 | 0 |
| | | | ↑ | ↑ | ↑ | ↑ |
| FIBER | | | 1 | 2 | 3 | 4 |

A more interesting example and one that shows the filtering effect of the WDM is to enter Table 5 at the bottom entry for fiber 3 and go up to the side entry for fiber 1. The intersection of those two fibers 1, 3 is 1360 nm. Table 4 shows that fiber 3 delivers 1360 nm to fiber 1 (as well as 1420 nm to itself). Further it can be seen in Table 4 that fiber 2 delivers the 1330 nm wavelength to fiber 1 (as well as 1360 nm to itself), and fiber 4 delivers 1390 nm to fiber 1 (as well as 1480 nm to itself) as shown in FIG. 18C. Thus, for the system where $\lambda_{L1}$=1300, $\lambda_{L2}$=1360, $\lambda_{L3}$=1420, a dn $\lambda_{L4}$=1480 nm, and where fiber 1 is the output fiber for wavelengths input on fibers 2-4, fiber 1 will pick up the wavelengths 1300 (its Littrow wavelength), 1330, 1360, and 1390. Thus, it can be seen that the central wavelength of each of the LEDs used in the system is determined not by the LED but by the WDM. Thus, the filtering of the WDM of the present invention allows four channels to be compressed into the space of only 90 nm or just 3× the wavelength separation of the sources used. This effect again is in accordance with Eq. 40 which states that the distance between the Littrow wavelength for adjacent fibers is $2\Delta\lambda$.

In the example above where $b_1/d_1$=4, that ratio of core to center fiber distance can be achieved by using dead fibers between live ones in the WDM. The system is adjusted so that the distance between central wavelengths of the ELEDs used is 30 nm and the Littrow wavelength of the first fiber is 1300 nm. In the case of ELEDs especially, $\Delta$ may equal 5 nm and the same analysis as above would apply. It can be seen that with $\Delta\lambda$=5 nm the total spectrum used by the filtered LEDs would only be about 20 nm.

Figure 18A:
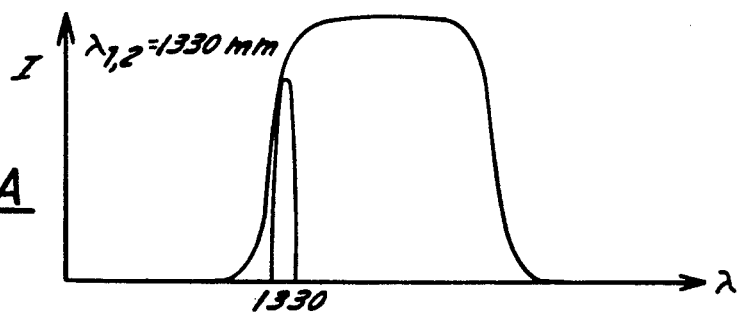
Figure 18B:
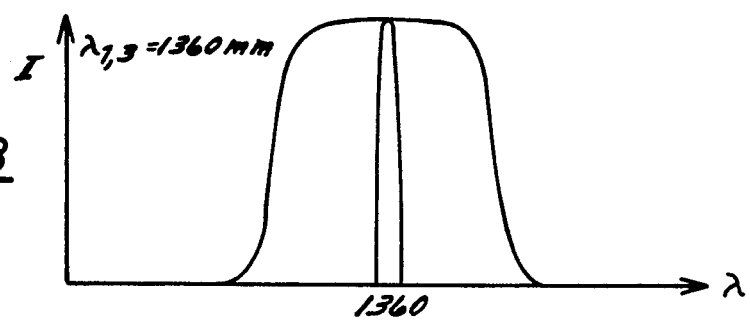
Figure 18C:
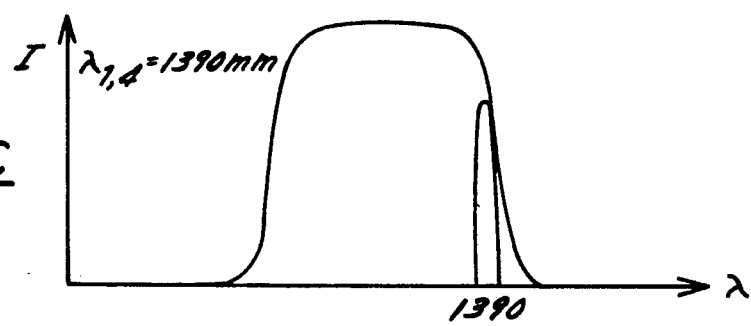
Figure 18D:
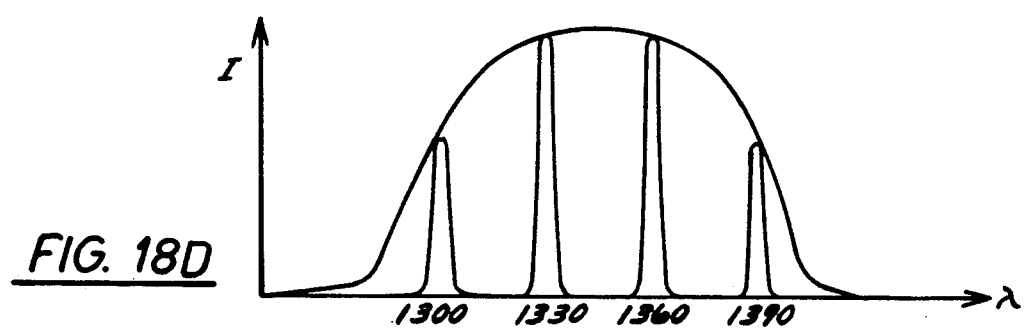

An alternative embodiment of the invention may use only one LED the spectrum of which would be sliced into the appropriate narrow linewidths for multiplexing on a single fiber as seen in FIGS. 18A-C. This is slightly less advantageous than the use of multiple LEDs the central frequency of which is filtered out and multiplexed because the wavelengths of the single LED spectrum that are located to either side of the central frequency will be of lesser power typically than the central wavelength and therefore will exhibit some power loss in the system as shown in FIG. 18D.

It should be mentioned that the optimum design for the multiplexing WDM is not necessarily the optimum design for the demultiplexing WDM. In other words, $$\frac{d1}{b1} \ne \frac{d2}{b2} \qquad \text{(Eq. 41)}$$

To compare an LD based system with an ELED based system Table 6 is presented below.

| | LD | ELED |
|---|---|---|
| power | 3 mW | 3 mW |
| WDDM Loss | 2 dB | 10 dB |
| WDM Loss | 2 dB | 3 dB |
| Pigtail Loss | 1 dB | 5 dB |
| Total Loss | 5 dB | 18 dB |
| Power Margin | 20 dB | 7 dB |

Thus, the system allows the use of LEDs at close wavelength spacing because the $d\lambda$ of the system is small. One would usually expect the $\Delta\lambda$ to be 100 nm to 500 nm whereas the $\Delta\lambda$ of the present invention is 30 nm due to the $\delta\lambda \approx 10$ nm. This allows the use of ELEDs which are low in cost and allows locating them close together in the wavelength spectrum.

Applications of an LED based link other than the three to four channel ELED system described above include a single LED and multiple external modulator system as depicted in FIG. 19 wherein a single LED is demultiplexed by a first WDM and each of the demultiplexed components is run through an external modulator the output of which is fed to a second WDM which multiplexes the signals for long distance transmission to a third WDM which demultiplexes the signals for use at a receiver. In another application the external modulators may appropriately be sensors instead of external modulators to pick up, for instance, three environmental parameters by modulating the light waves in the fibers. Such a smart skin system is depicted in FIG. 20 showing one LED and four WDMs one of which demultiplexes four wavelengths from the LED and passes them to a network of three other WDMs through sensors located at the intersection of the fibers for multiplexing by the three WDMs and transfer to a demultiplexing WDM at a receiver. In this way, the smart skin network can sense a large area and a variety of quadrents, determined by (x,y) coordinates.

Referring to the system illustrated in FIGS. 21A and B, it should be emphasized that it is important to avoid cross-talk between the output signal $\lambda_1$ and input signal $\lambda_2$, as it is schematically illustrated in FIG. 21A depicting for example a Raman sensor. FIG. 21B shows a sensing probe having two detectors $R_1$ and $R_2$ which can compare wavelengths $\lambda_2$ and $\lambda_3$ received from the medium to be sensed. $\lambda_3$ may also be used simply as a reference wave to sense unwanted motion of the fiber. The LD or ELED may also be directly pigtailed to detector R in FIG. 21B, obtaining a bi-directional WDM grating splitter using the same WDM geometry as in FIG. 3.

As seen in FIG. 22, signal $\lambda_1$ emitted by a laser diode LD (or ELED) in a transceiver is usually much stronger than the received signal $\lambda_2$ due to its close proximity to the detector R and therefore should be isolated from detector R located in the same transceiver as shown schematically in FIG. 22.

FIG. 23 shows a preferred structure of a WDM which prevents cross-talk. It is not possible for $\lambda_1$ from LD 154 to enter detector 158 because $\lambda_1$ is dispersed in the direction of Fresnel reflection. This optical isolation preferably is very high, down to −60 dB of optical cross-talk, equivalent to −120 dB of electrical cross-talk. As shown in FIG. 24, a camera embodying the isolation circuitry shown in FIG. 23 may be employed wherein $\lambda_1$ is the image signal and $\lambda_2$ is a coded information signal containing for example positioning information fed to the camera from a remote controlling location.

Referring again to FIG. 23, $\beta_2 < \beta_1$; thus, $\lambda_2 < \lambda_1$. Typical dimensions are D=100 μ, g=5 μ, d=62.5 μ. Pertinent grating equations are $$\sin\alpha + \sin\beta_1 = \frac{\lambda_1}{\Lambda_{//}} \quad \text{(Eq. 42)}$$

$$\sin\alpha + \sin\beta_2 = \frac{\lambda_2}{\Lambda_{//}} \quad \text{(Eq. 43)}$$

(incident angle and diffraction angles are reversible here.)

$$2\sin\alpha = \frac{\lambda_L}{\Lambda_{//}} \quad \text{(Eq. 44)}$$

for Littrow wavelength, $\lambda_L$, also $$K_\lambda = \frac{\partial \beta}{\partial \lambda} = \frac{2\tan\alpha}{\lambda_L} \quad \text{(Eq. 45)}$$

From FIG. 23

$$\Delta x_2 = f k_\lambda (\lambda_1 - \lambda_L) \quad \text{(Eq. 46)}$$

$$\Delta x_1 = f k_\lambda (\lambda_L - \lambda_2) \quad \text{(Eq. 47)}$$

where f is the focal length of the lens not shown in FIG. 23. It is seen that this system as excellent optical isolation, since the $\lambda_1$ signal emitted by the source LD 154 is diffracted to the fiber 156 at diffraction angle $\alpha$, and the Fresnel reflection from the fiber front surface is not retro-reflected to the detector 158. Analogously, the Fresnel reflection from the grating 159 is not retro-reflected to the detector. (If $\lambda_1 < \lambda_2$, the position of the source and detector should be reversed.) Since d >> g, and D >> d, power budget is excellent. Th tolerance coefficients, $H_1$ and $H_2$, characterizing the signal broadening, due to either wavelength shift (for LD) or source linewidth (for LED) must be calculated. We have, for coupling between sources and fiber, $$H_1 = \frac{\delta x_\alpha}{d} \quad \text{(Eq. 48)}$$

where $$\delta x_\alpha = f k_\lambda \delta \lambda \quad \text{(Eq. 49)}$$

and $\delta\lambda$ characteristics wavelength shift for the LD and linewidth for LED (or ELED). Substituting Eqs. 47 and 48 into Eq. 49, we obtain $$H_1 = \frac{\partial x_\alpha}{\Delta x_1} \frac{\Delta x_1}{d} = \frac{\Delta x_T}{d} \frac{\Delta \lambda}{\lambda_1 - \lambda_L} . \quad \text{(Eq. 50)}$$

For $\lambda_1 = 720$ nm, $\lambda_2 = 810$ nm (thus, $\Delta\lambda = 90$ nm), and $\delta\lambda = 9$ nm, and $\Delta x_1 = 5$ d, we obtain from Eq. 50 $H_1 = 0.5$, and superior optical isolation. Analogously, we obtain $$H_2 = \frac{\Delta x_2}{D} \frac{\delta \lambda}{\lambda_2 - \lambda_L} \quad \text{(Eq. 51)}$$

The system illustrated in FIG. 21A, can be used as a Raman sensor with excellent optical isolation (that may be improved by using GRIN optics in the front of the source and interference filters) or as transceivers in security cameras, where the output signal $\lambda_2$ is perfectly isolated from the input signal ($\lambda_1$) as shown in FIG. 24.

All the above WDM systems, based on grating dispersion, cannot tolerate very high k-coefficients (see Eqs. 1 and 32), close to 1. Therefore, a dispersion-compensation WDM system used previously for holographic imaging applications as in Collier et al., Optical Holography; see also R. Kim, S. Case, SPIE Proc. 1052, (1989) needs to be applied.

A dispersion-compensation WDM system of the present invention is illustrated in FIG. 25. The multiplex fiber 161, transmitting multiwavelength signals $\lambda_1$, $\lambda_2$, $\lambda_3$, is pigtailed to the GRIN lens 16$_7$ (that can be replaced by a conventional microlens). The optical beam transmitted by the input fiber 160 is collimated by the GRIN lens 161 to an expanded wavefront 162. This wavefront is slightly divergent, with the divergence angle $\delta\alpha$, in the form $$\delta\alpha = \frac{NA'}{C} \quad \text{(Eq. 52)}$$

where NA' is the numerical aperture of the input fiber, and C' is the collimation ratio of the GRIN lens 161. The collimated beam 162 is incident upon the first reflection grating 163, that is a Littrow-type grating (DCG, photopolymer or photoresist). The beam 162 is diffracted into the wave 164, and then diffracted again by the 2nd reflection grating 165. Both grating 163 and 165 are conjugated in the sense that they can compensate wavefronts. If they are uniform, their grating constants $\Lambda_{11}$ identical. If they are in the form of HOEs, they are phase-conjugated. Since, due to the preferred use of two conjugate gratings dispersion is compensated for, the divergence of the 2nd diffracted beam 164 is the same as that of the beam 162, although the spot size increases, i.e., $D''' > D'' > D' > D$. Although, the system in FIG. 25 is a generalization of the system in FIG. 3, its advantage is that it can couple the output beam 105 without loss to output fibers (166', 166'', 166'''), even if the fibers 160 end 166 are identical. In such a case, we need to satisfy the following condition:

$$\frac{D}{C} = \frac{D'''}{C''} \quad \text{(Eq. 53)}$$

where C'' is the concentration ratio of the output GRIN lenses 167. Therefore $C'' \neq C'$, and GRIN lenses can not be identical. In another version, reflection gratings 163 and 165 can be replaced with transmission gratings. Also, input fibers can be replaced by laser sources (LDs, LEDs, ELEDs), and output fibers by detectors.

The excellent power budget and high power margin of the data link of the present invention is useful in situations where untrained personnel is used to hook up the link. Additionally the low cost of the light sources (CD LDs and ELEDs) allows the economical implementation of highly redundant systems having other sources and fibers. If one source dies the system can be switched to an existing alternative source. The data link of the present invention may also be used for high hierarchy secured channels. If a three channel system is in use, two of the multi-wavelength channels can be used for communication and the third wavelength, which would advantageously be located close due to the fact that various fiber guided waves with different wavelengths have different space locations in the fiber to the cladding can be monitored for tapping by unwanted sources.

Embodiments of the present invention not disclosed herein are fully intended to be within the scope of the claims.

We claim:

1. A Raman sensor for sensing incident light scattered from a scattering medium, said sensor comprising an incident light source, a uniform broadband reflection grating at the Littrow position, a detector, and a fiber having first and second ends, said light source, grating, detector, and fiber being positioned paraxially, said grating positioned to receive incident light from said light source, said fiber positioned to receive in said first end incident light diffracted from said grating and to direct said light so as to be incident on and to scatter from said scattering medium and back into said second end and out of said first end, said grating positioned to receive scattered light from said first end, said detector positioned to receive scattered light diffracted from said grating, said sensor being fully transparent so that said incident and said scattered light remain isolated from each other and cross-talk is substantially nonexistent.

2. A multiwavelength sensor for sensing incident light scattered from a scattering medium, said sensor comprising an incident light source, a uniform broadband reflection grating at the Littrow position, a detector, and a fiber having first and second ends, said light source, grating, detector, and fiber being positioned paraxially, said grating positioned to receive incident light from said light source, said fiber positioned to receive in said first end incident light diffracted rom said grating and to direct said light so as to be incident on and to scatter from aid scattering medium and back into said second end and out of said first end, said grating positioned to receive scattered light from said first end, said detector positioned to receive scattered light diffracted from said grating, said sensor being fully transparent so that said incident and said scattered light remain highly optically isolated from each other and cross-talk is substantially nonexistent.

3. A multiwavelength sensor for sensing light scattered from a scattering medium, said sensor comprising;
 a. a slight source;
 b. a uniform broadband reflection grating at the Littrow position and upon which light from the source is incident, said grating diffracting said light;
 c. a fiber having a first end into which said light diffracted from said grating is received and having a second end rom which said light exits, said fiber being positioned so that said light is incident upon and scattered from said scattering medium, at least some of said light scattered from said medium being scattered back into said second end and out of said first end and incident upon said diffraction rating;
 d. a detector upon which said light out of said first end and diffracted from said grating is incident;
said sensor being fully transparent so that light raveling toward the second end and light traveling back toward the first end are optically isolated and cross-talk is substantially nonexistent.

4. A multiwavelength sensor for sensing incident light scattered from a scattering medium, the sensor comprising:
 a. a light source having wavelength $\lambda_0$;
 b. a uniform broadband reflection grating at the Littrow position and upon which light from said source is incident, said grating diffracting said light;
 c. a fiber having one end into which said light diffracted from said grating is directed and positioned so that said light exiting an opposite end is incident upon and scattered from said scattering medium into wavelengths $\lambda_1$ and $\lambda_2$, said wavelengths $\lambda_1$ and $\lambda_2$ being scattered back into said opposite end and out of said one end and incident upon said diffraction grating, said wavelength $\lambda_1$ being diffracted toward a first detector and wavelength $\lambda_2$ being diffracted toward a second detector, said first and second detectors comparing wavelengths $\lambda_1$ and $\lambda_2$; said sensor being fully transparent so that wavelength $\lambda_0$ and wavelengths $\lambda_1$ and $\lambda_2$ are optically isolated and cross talk is substantially nonexistent.

5. A method of sensing light scattered from a scattering medium, said method comprising:
 a. transmitting light from a light source;
 b. diffracting said light via a uniform broadband reflection grating at the Littrow position and upon which said light is incident;
 c. receiving light diffracted from said grating into a first end of a fiber, and transmitting said diffracted light out of a second end of said fiber, said fiber being positioned so that said diffracted light is incident upon and scattered from said scattering medium, at least some of said light scattered rom said medium being scattered back into said second end and transmitted out of said first end and incident upon said grating;

d. detecting said light transmitted out of said first end and scattered from said grating;

wherein light traveling toward the second end and light traveling back toward the first end are optically isolated and cross-talk is substantially nonexistent.

* * * * *